(12) United States Patent
Tagami et al.

(10) Patent No.: US 10,854,238 B2
(45) Date of Patent: Dec. 1, 2020

(54) MAGNETIC DISK DEVICE AND LINEARITY ERROR CORRECTION METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventors: Naoki Tagami, Yokohama Kanagawa (JP); Makoto Asakura, Tokyo (JP); Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/568,946

(22) Filed: Sep. 12, 2019

(65) Prior Publication Data

US 2020/0185004 A1 Jun. 11, 2020

(30) Foreign Application Priority Data

Dec. 7, 2018 (JP) .................................. 2018-229903

(51) Int. Cl.
*G11B 20/10* (2006.01)
*G11B 5/012* (2006.01)

(52) U.S. Cl.
CPC ........ *G11B 20/10268* (2013.01); *G11B 5/012* (2013.01)

(58) Field of Classification Search
CPC . G11B 5/59655; G11B 5/59688; G11B 5/596; G11B 5/59627; G11B 20/10388; G11B 20/12; G11B 2220/1281; G11B 20/10268

USPC ....... 360/27, 31, 77.04, 67, 77.08, 78.14, 29
See application file for complete search history.

(56) References Cited

U.S. PATENT DOCUMENTS

| | | | |
|---|---|---|---|
| 7,859,778 B1 | 12/2010 | Vikramaditya et al. | |
| 8,023,219 B2 | 9/2011 | Kosugi | |
| 8,625,230 B2 | 1/2014 | Kosugi et al. | |
| 8,848,303 B1 | 9/2014 | Yamada | |
| 8,891,194 B1 | 11/2014 | Chu et al. | |
| 9,177,581 B2* | 11/2015 | Yamada ............... | G11B 5/4886 |
| 9,230,584 B1* | 1/2016 | Kosugi .................. | G11B 5/596 |
| 9,799,360 B2 | 10/2017 | Tagami | |
| 2010/0128386 A1 | 5/2010 | Keizer et al. | |
| 2012/0293885 A1 | 11/2012 | Kosugi et al. | |
| 2015/0055239 A1 | 2/2015 | Nara | |
| 2015/0302876 A1 | 10/2015 | Kashiwagi et al. | |

(Continued)

FOREIGN PATENT DOCUMENTS

| | | |
|---|---|---|
| JP | 5162004 B2 | 3/2013 |
| JP | 2019-117672 A | 7/2019 |
| JP | 2019-133730 A | 8/2019 |

*Primary Examiner* — Nabil Z Hindi
(74) *Attorney, Agent, or Firm* — White & Case LLP

(57) ABSTRACT

According to one embodiment, a magnetic disk device includes a disk including a recording region including servo sectors, a head configured to write data to the disk and read data from the disk, and a controller configured to demodulate a plurality of pieces of demodulation data from servo data read from servo sectors, divide the demodulation data into a plurality of pieces of division data corresponding to division regions, perform linearity correction corresponding to a plurality of pieces of division data in each of the division regions.

17 Claims, 22 Drawing Sheets

(56) References Cited

U.S. PATENT DOCUMENTS

2019/0198050 A1 6/2019 Tagami et al.
2019/0237098 A1 8/2019 Asakura et al.

\* cited by examiner

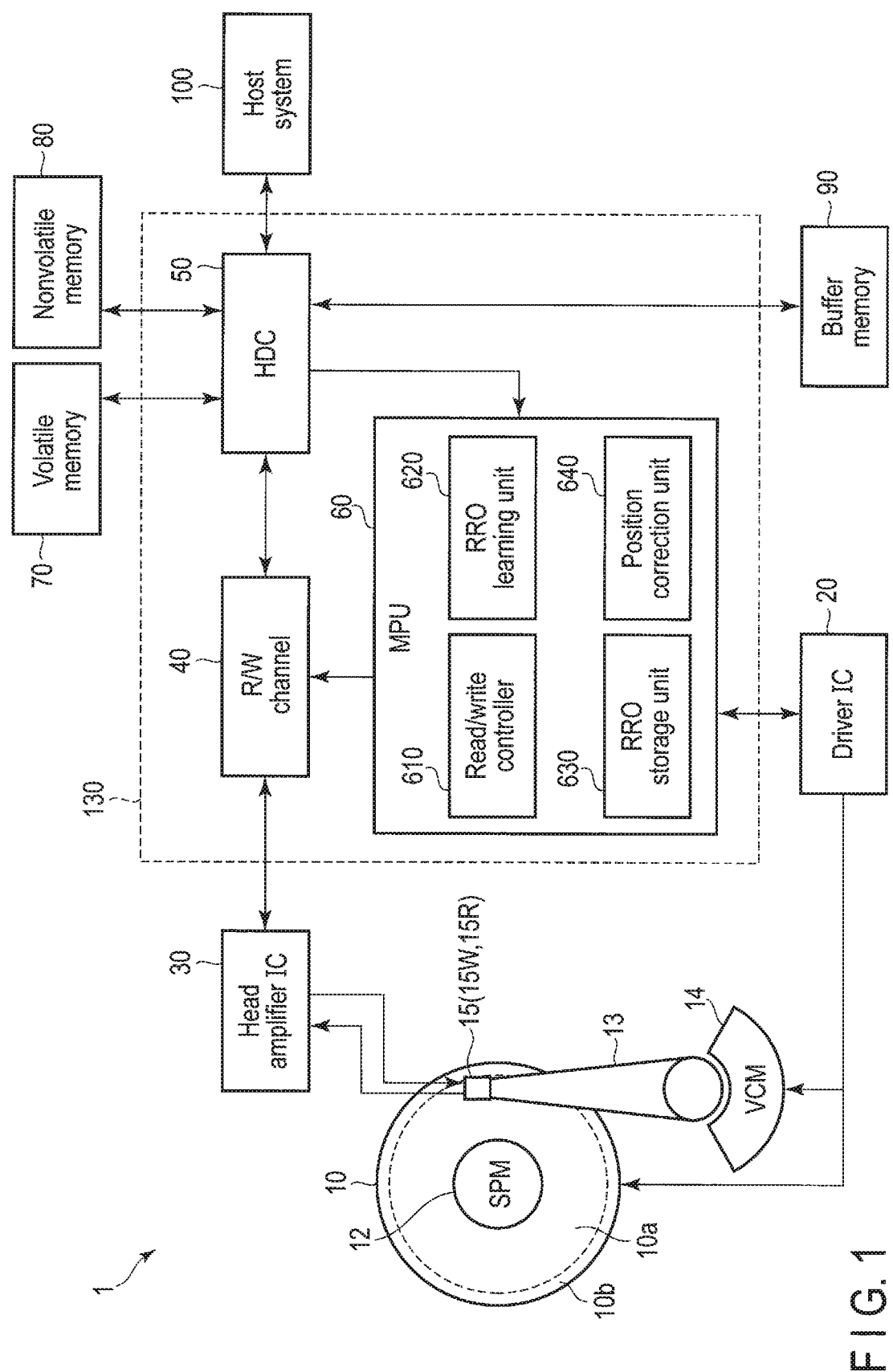
F I G. 1

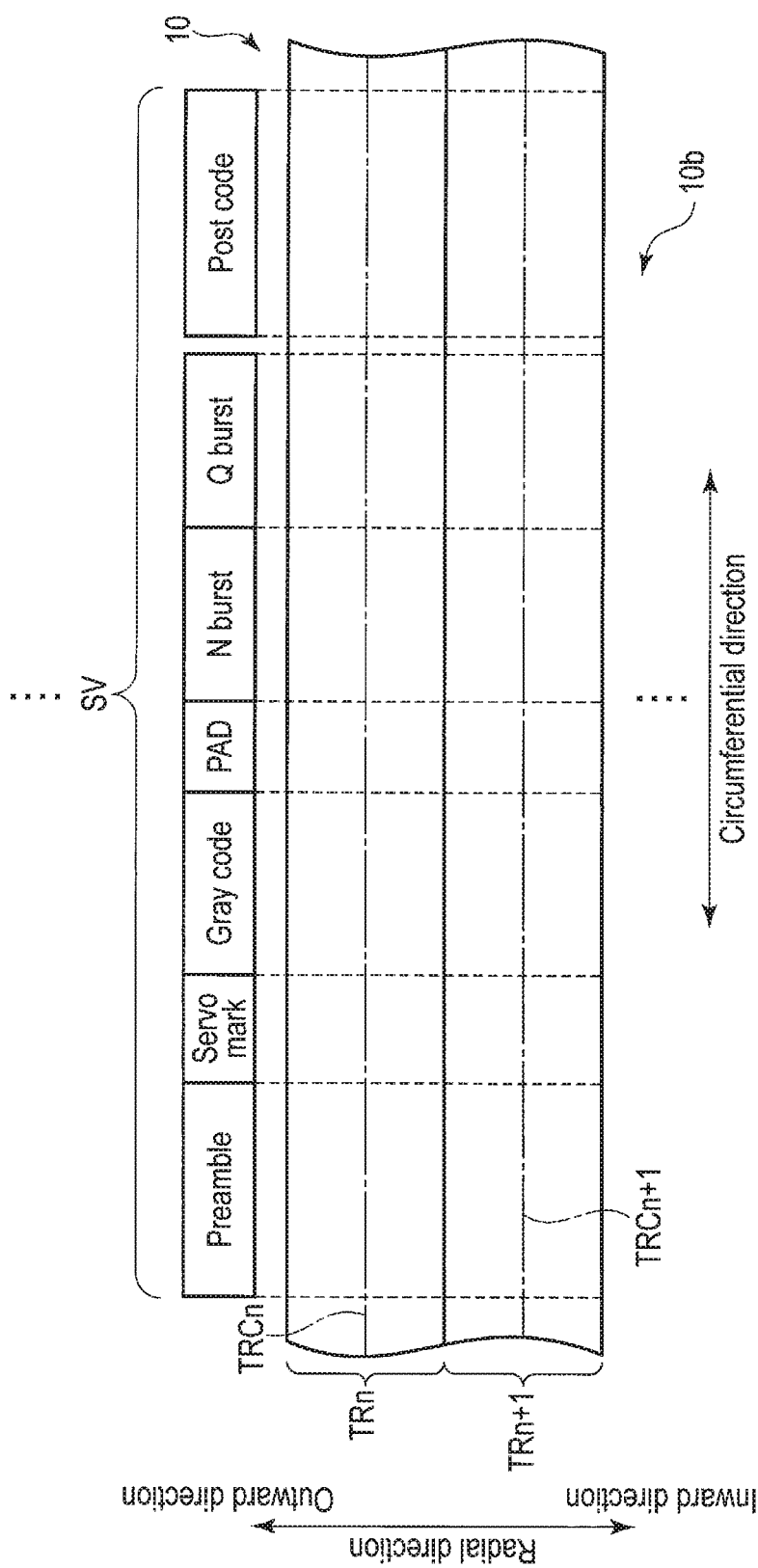
F I G. 3

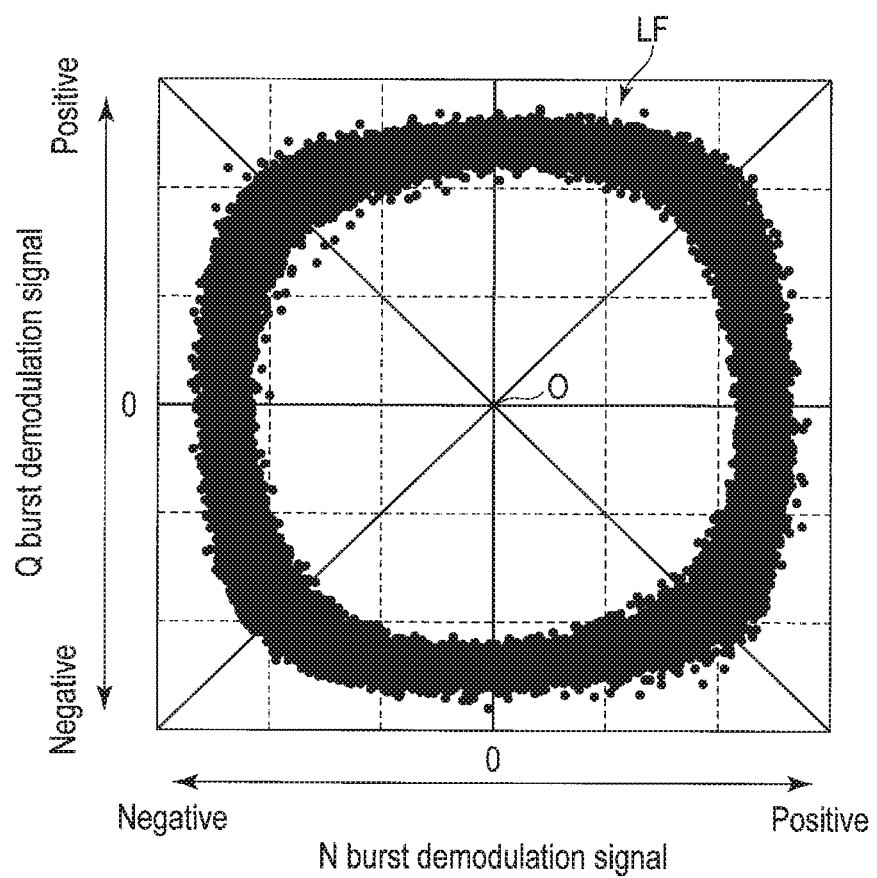
F I G. 4

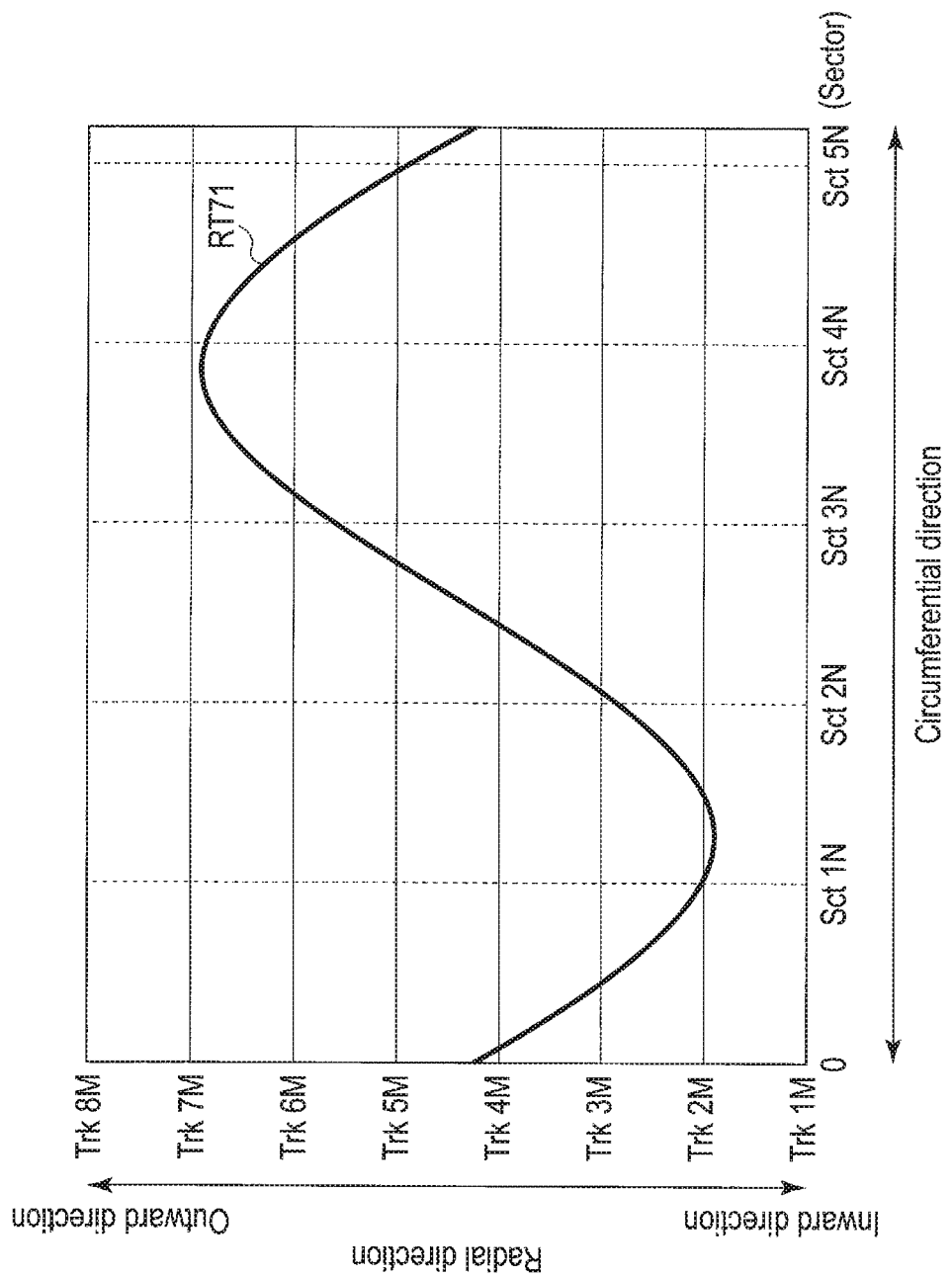
F I G. 7

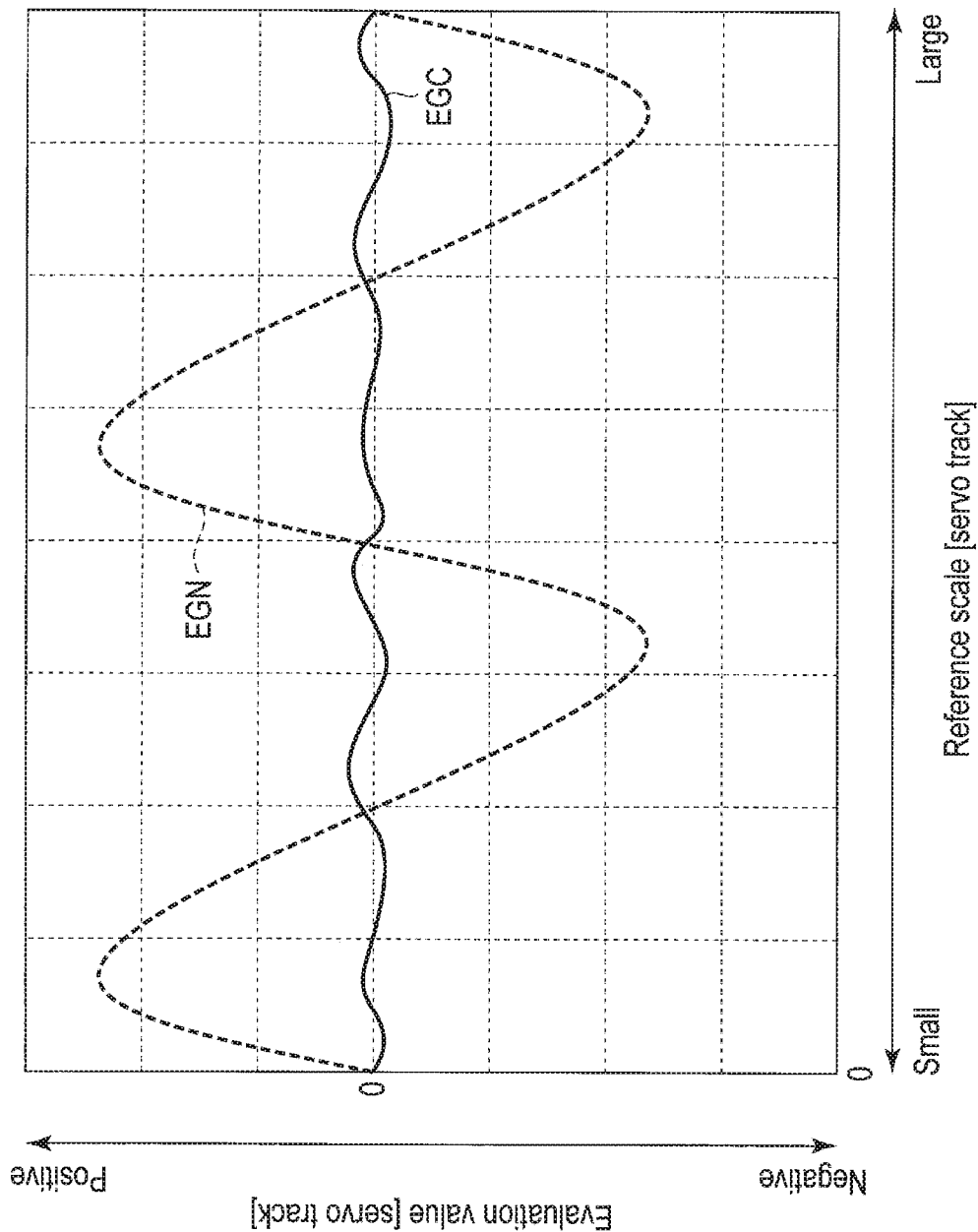
F I G. 12

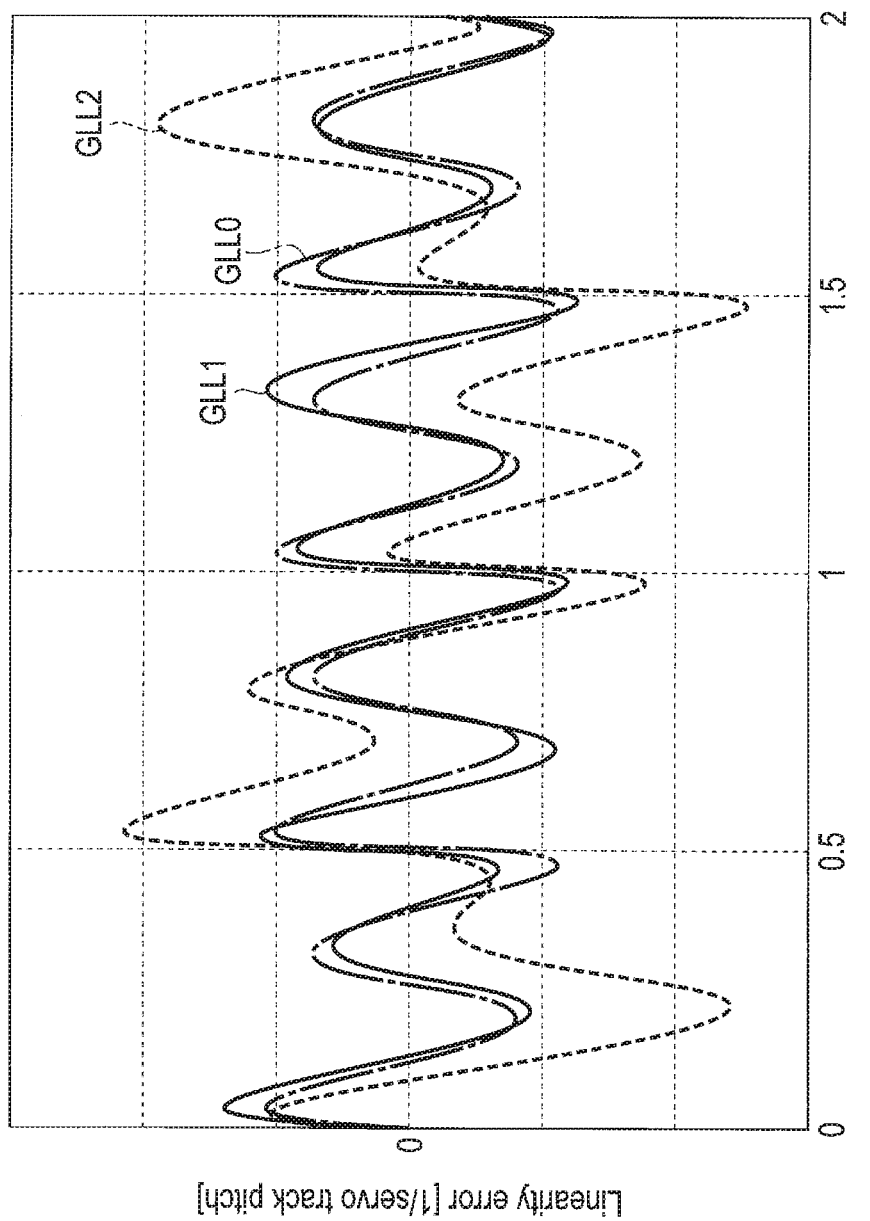
F I G. 16

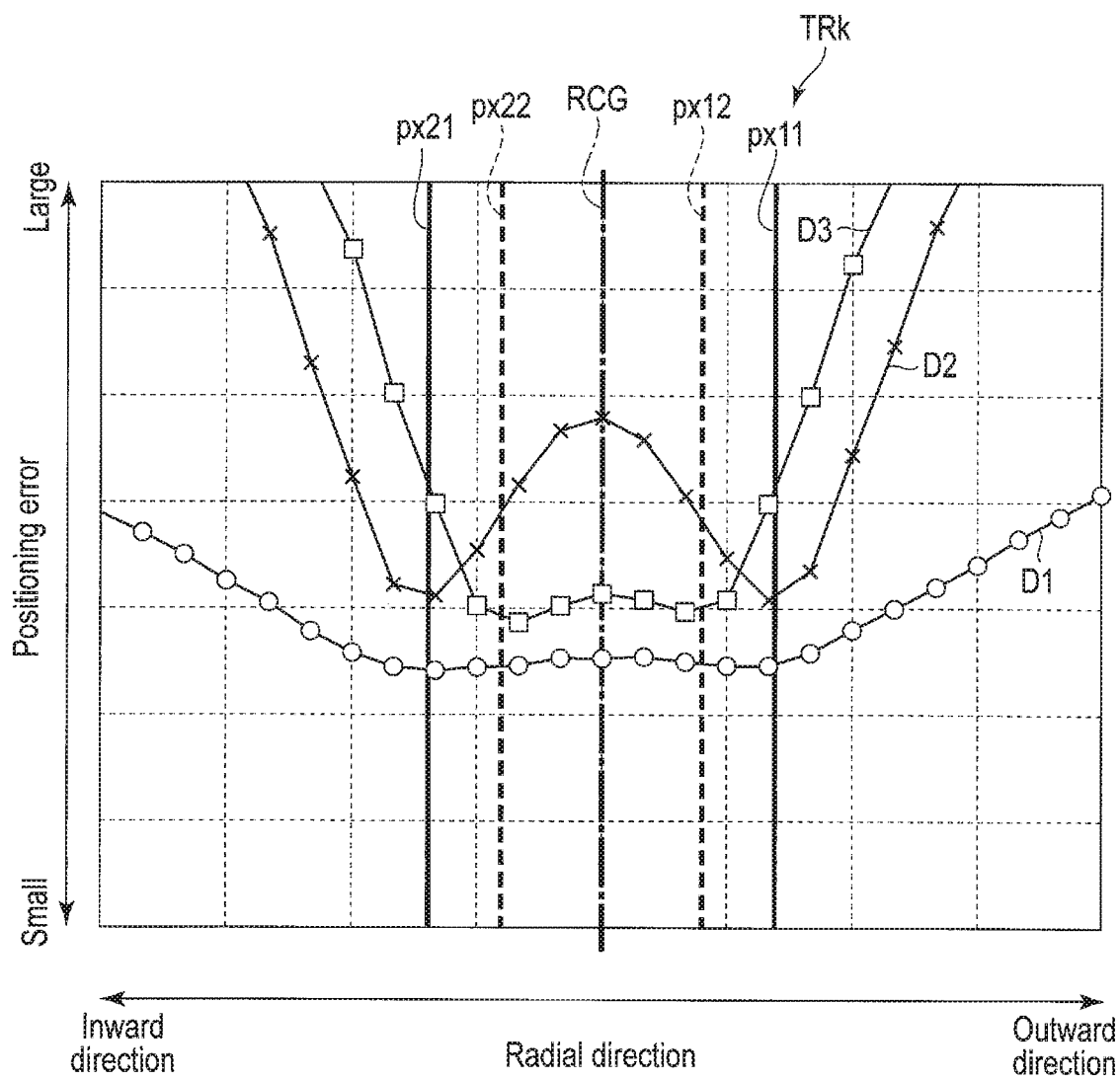
F I G. 17

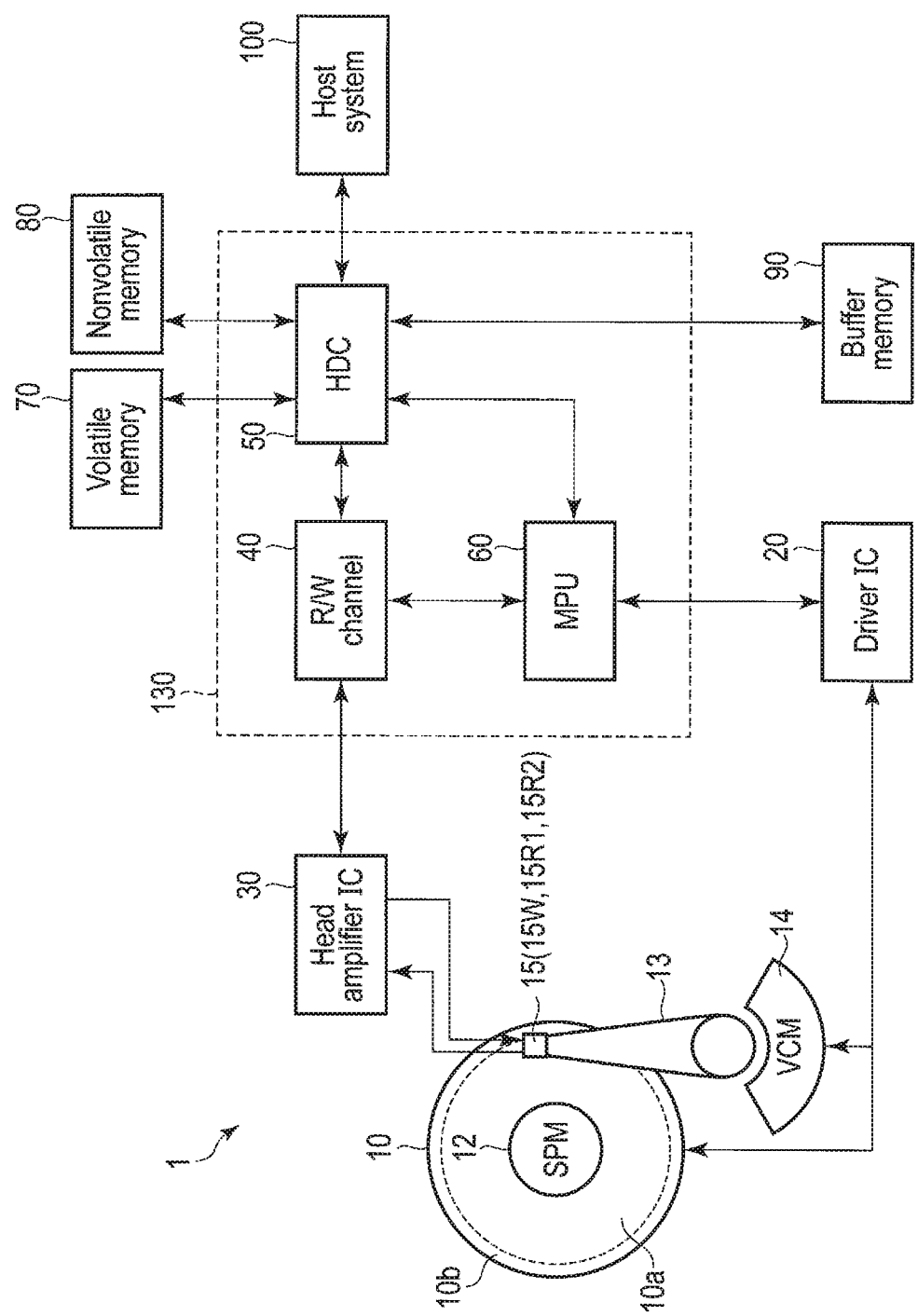
F I G. 20

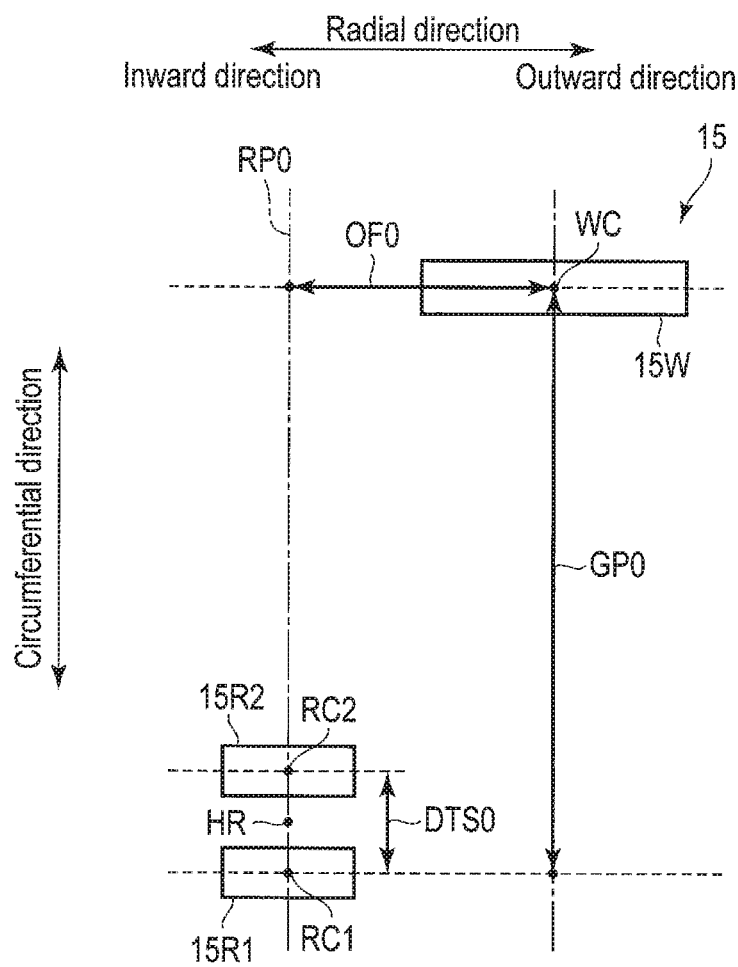
F I G. 21

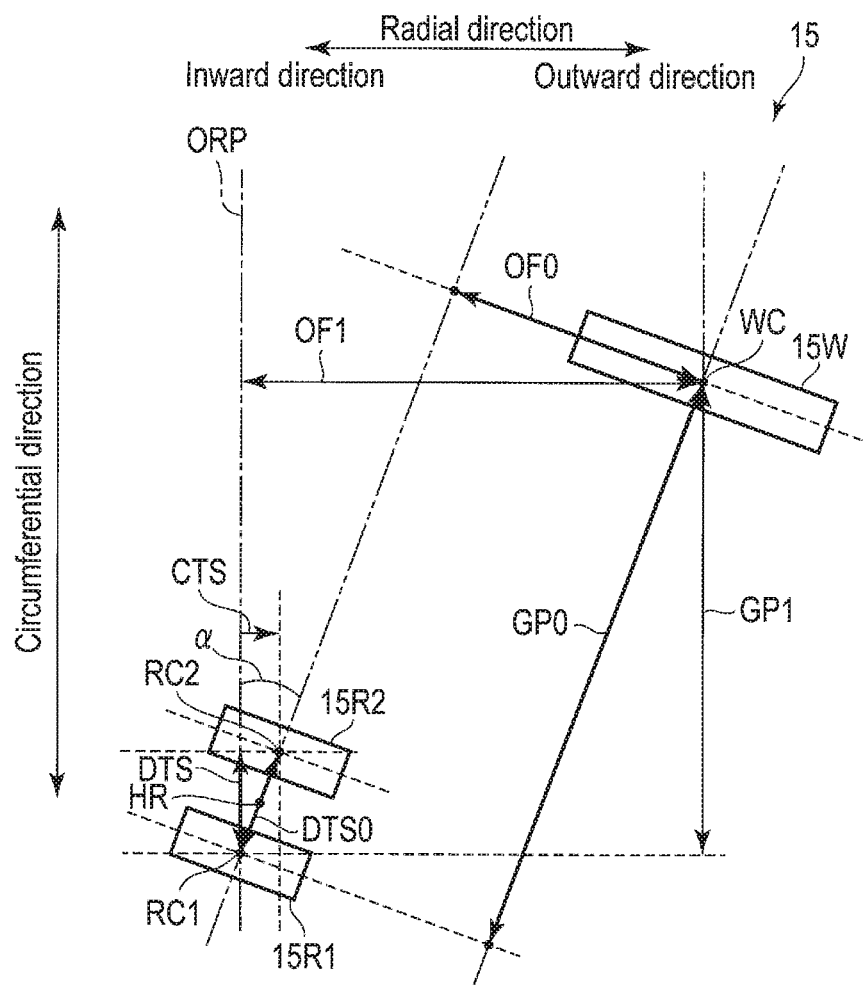
F I G. 22

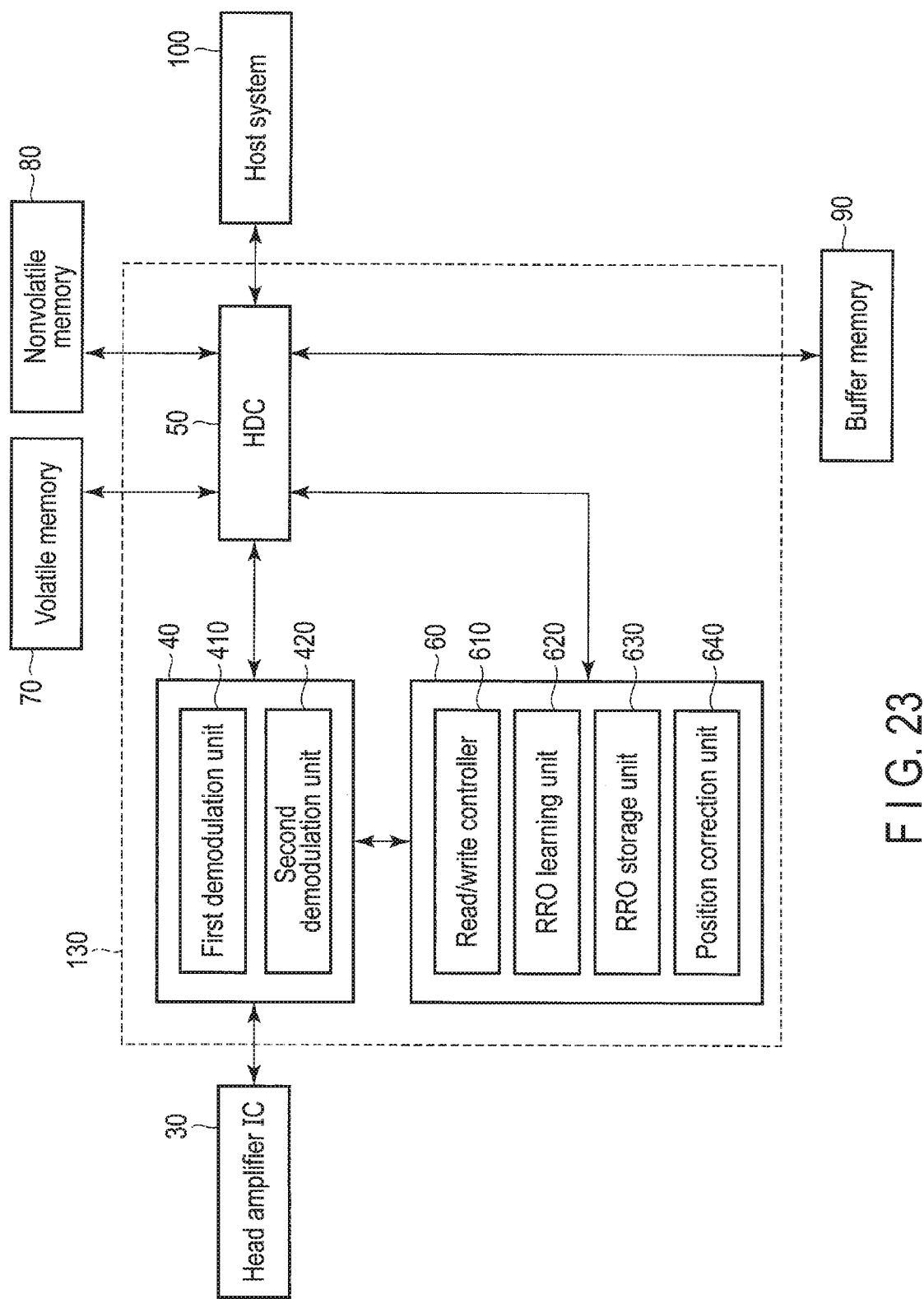
F I G. 23

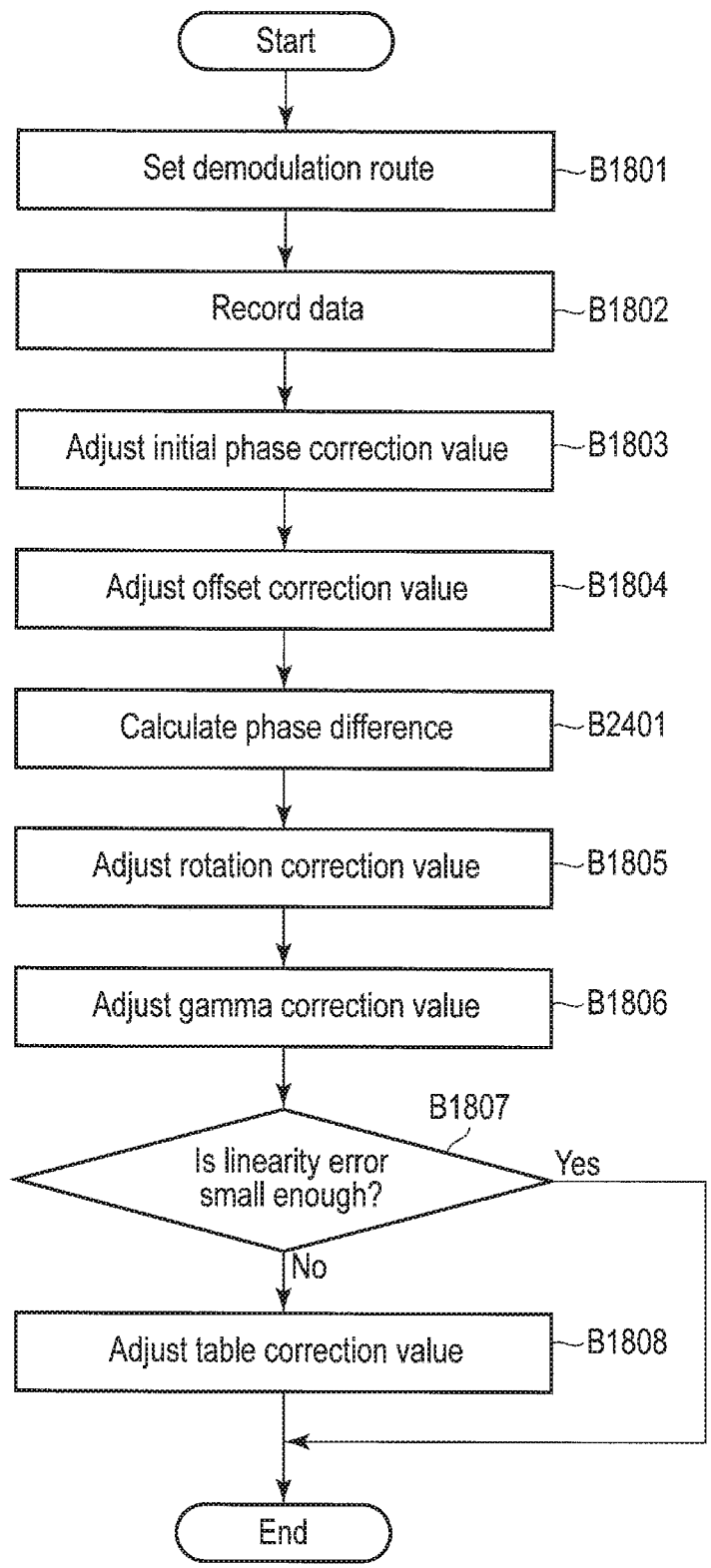
F I G. 24

MAGNETIC DISK DEVICE AND LINEARITY ERROR CORRECTION METHOD

CROSS-REFERENCE TO RELATED APPLICATIONS

This application is based upon and claims the benefit of priority from Japanese Patent Application No. 2018-229903, filed Dec. 7, 2018, the entire contents of which are incorporated herein by reference.

FIELD

Embodiments described herein relate generally to a magnetic disk device and a linearity error correction method.

BACKGROUND

As a magnetic disk device, a technology of correction a position of a head by suppressing an error caused by a repeatable run out (RRO) (hereinafter, referred to simply as "RRO") is developed. For example, there is a method of measuring the RRO at a plurality of different positions in a radial direction of a disk and correcting a position of a head based on data in which the RRO between a plurality of pieces of data measured is interpolated. In the method of correcting the position of the head, to appropriately set positions at which the RRO is measured, correction of a linearity error becomes important.

BRIEF DESCRIPTION OF THE DRAWINGS

FIG. 1 is a block diagram illustrating a configuration of a magnetic disk device 1 according to a first embodiment.

FIG. 3 is a schematic view illustrating an example of a configuration of a servo region.

FIG. 4 is a view illustrating an example of a Lissajous waveform according to a demodulation signal obtained by demodulating burst data read from N burst and a demodulation signal obtained by demodulating burst data read from Q burst.

FIG. 7 is a view illustrating an example of a route of a head that reads servo data for calculating a correction parameter.

FIG. 12 is a view illustrating an example of a variation of an evaluation value with respect to a reference scale.

FIG. 16 is a view illustrating an example of a variation of a linearity error with respect to a servo track.

FIG. 17 is a view illustrating an example of a linear learning position and a distribution of a positioning error corresponding to a linearity error.

FIG. 20 is a block diagram illustrating a configuration of a magnetic disk device according to a second embodiment.

FIG. 21 is a view illustrating an example of a geometric arrangement of a write head and two read heads in a case where the read heads are located at a reference position illustrated in FIG. 2.

FIG. 22 is a view illustrating an example of a geometric arrangement of the write head and the two read heads in a case where one of the read heads is located at a radial position illustrated in FIG. 2.

FIG. 23 is a block diagram illustrating a configuration example of an R/W channel and an MPU according to a second embodiment.

FIG. 24 is a flowchart illustrating an example of an adjustment method of the parameter that is used in correction of the linearity error according to the second embodiment.

DETAILED DESCRIPTION

Figure 2:
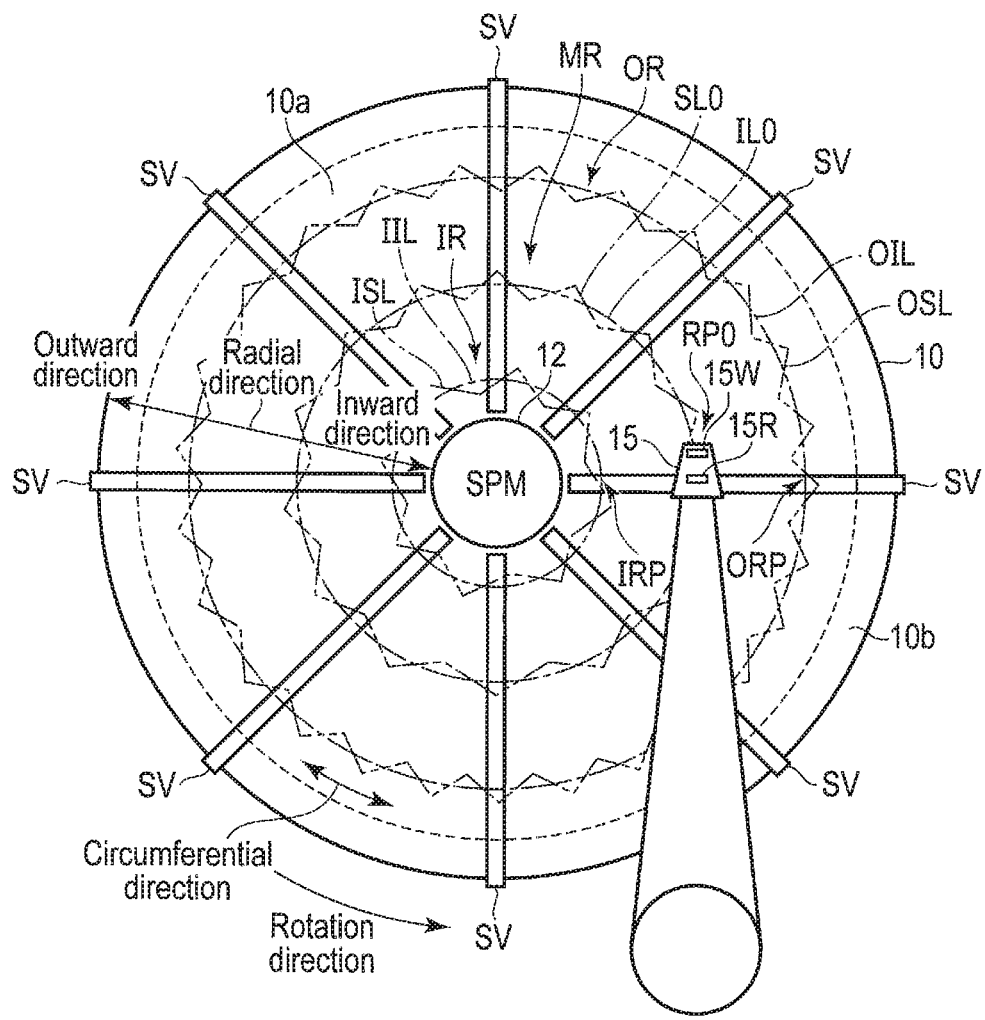
FIG. 2 is a schematic view illustrating an example of disposition of a head 15 with respect to a disk according to the first embodiment.

In general, according to one embodiment, a magnetic disk device comprises: a disk comprising a recording region including servo sectors; a head configured to write data to the disk and read data from the disk; and a controller configured to demodulate a plurality of pieces of demodulation data from servo data read from servo sectors, divide the demodulation data into a plurality of pieces of division data corresponding to division regions, perform linearity correction corresponding to a plurality of pieces of division data in each of the division regions.

Hereinafter, embodiments will be described with reference to the accompanying drawings. It should be noted that, the drawings are illustrative only, and do not limit the scope of the invention.

First Embodiment

FIG. 1 is a block diagram illustrating a configuration of a magnetic disk device 1 according to a first embodiment.

The magnetic disk device 1 includes a head/disk assembly (HDA) described later, a driver IC 20, a head amplifier integrated circuit (hereinafter, referred to as "head amplifier IC or preamplifier") 30, a volatile memory 70, a nonvolatile memory 80, a buffer memory (buffer) 90, and a system controller 130 that is a one-chip integrated circuit. In addition, the magnetic disk device 1 is connected to a host system (hereinafter, referred to simply as "host") 100.

The HDA includes a magnetic disk (hereinafter, referred to as "disk") 10, a spindle motor (hereinafter, referred to as "SPM") 12, an arm 13 on which a head 15 is mounted, and a voice coil motor (hereinafter, referred to as "VCM") 14. The disk 10 is attached to the SPM 12, and is rotated by driving of the SPM 12. The arm 13 and the VCM 14 constitute an actuator. The actuator controls movement of the head 15 mounted on the arm 13 up to a particular position of the disk 10 through driving of the VCM 14. Two or more pieces of the disk 10 and two or more pieces of the heads 15 may be provided.

In the disk 10, a user data region 10*a* that can be used from a user and a system area 10*b* on which information necessary for system management is written are allocated to a region on which data can be written.

Hereinafter, a direction orthogonal to a radial direction of the disk 10 is referred to as "circumferential direction". In addition, a particular position of the disk 10 in the radial direction may be referred to as "radial position", and a particular position of the disk 10 in the circumferential direction may be referred to as "circumferential position". For example, the radial position corresponds to a track, and the circumferential position corresponds to, for example, a sector. The radial position and the circumferential position may be collectively referred to simply as "position".

The head 15 includes a slider as a main body, and a write head 15W and a read head 15R which are mounted in the slider. The write head 15W writes data on the disk 10. The read head 15R reads data recorded on a track on the disk 10. It should be noted that, the write head 15W may be referred to simply as "head 15", the read head 15R may be referred to simply as "head 15", and the write head 15W and the read head 15R may be referred to collectively as "head 15". The central portion of the head 15 may be referred to as "head 15", the central portion of the write head 15W may be referred to as "write head 15W", and the central portion of the read head 15R may be referred to as "read head 15R". The "track" is used to represent a region among a plurality of regions obtained by dividing the disk 10 in the radial direction of, data that extends in the circumferential direction of the disk 10, data that is written on the track, and other various meanings. The "sector" is used to represent a region among a plurality of regions obtained by dividing the track in the circumferential direction, data that is written on a particular position of the disk 10, data that is written on the sector, and other various meanings. In addition, a width of the track in the radial direction is referred to as "track width", and the central position of a target track width is referred to as "track center".

FIG. 2 is a schematic view illustrating an example of disposition of the head 15 with respect to the disk 10 according to the first embodiment. In FIG. 2, in the radial direction, a direction facing an outer periphery of the disk 10 is referred to as "outward direction (outer side)", and a direction opposite to the outward direction is referred to as "inward direction". In addition, in FIG. 2, a rotation direction of the disk 10 is illustrated. It should be noted that, the rotation direction may be an opposite direction. In FIG. 2, the user data region 10*a* is divided into an inner peripheral region IR that is located in the inward direction, an outer peripheral region OR that is located in the outward direction, and an intermediate peripheral region MR that is located between the inner peripheral region IR and the outer peripheral region OR. In FIG. 2, a radial position IRP, a radial position RP0, and a radial position ORP are illustrated. The radial position IRP is located in the inward direction in comparison to the radial position RP0, and the radial position ORP is located in the outward direction in comparison to the radial position RP0. In FIG. 2, the radial position RP0 is located in the intermediate peripheral region MR, the radial position ORP is located in the outer peripheral region OR, the radial position IRP is located in the inner peripheral region IR. It should be noted that, the radial position RP0 may be located in the outer peripheral region OR or the inner peripheral region IR. FIG. 2 illustrates a circumferential locus of a track center (hereinafter, referred to simply as "tract center") IIL of a particular track in the inner peripheral region IR, a track center IL0 of a particular track in the intermediate peripheral region MR, and a track center OIL of a particular track in the outer peripheral region OR. The track center IIL is equivalent to a route (hereinafter, referred to as "target route", "target orbit", or "target locus") set as a target of the head 15 in a case where the head 15 is positioned to a particular track of the inner peripheral region IR. The track center IIL corresponds to the radial position IRP. The track center IL0 is equivalent to a target route of the head 15 in a case where the head 15 is positioned to a particular track of the intermediate peripheral region MR. The track center IL0 corresponds to the radial position RP0. The track center OIL is equivalent to a target route of the head 15 in a case where the head 15 is positioned to a particular track of the outer peripheral region OR. The track center OIL corresponds to the radial position ORP. For example, the target route is a route that is concentric to the disk 10. In addition, in FIG. 2, routes ISL, SL0, and OSL of the head 15 which respectively deviate from the track centers IIL, IL0, and OIL due to the repeatable run out (RRO) are illustrated.

The disk 10 includes a plurality of servo regions SV. Hereinafter, each of the servo regions SV may be referred to as "servo sector". The plurality of servo regions SV radially extend in the radial direction of the disk 10 and are discretely arranged in the circumferential direction with particular intervals.

The servo region SV includes servo data and RRO correction data for positioning the head 15 of the disk 10 at a particular position in the radial direction (hereinafter, referred to as "radial position").

For example, the servo data is null servo data. For example, the servo data includes a servo mark, address data, burst data, and the like. The address data includes an address (cylinder address) of a particular track and an address of a servo sector of a particular track. The burst data is data (relative position data) that is used to detect a positional deviation (positional error) of the head 15 with respect to a track center of a particular track in the radial direction and/or the circumferential direction, and is constructed by a repetitive pattern of a particular cycle. The burst data is written over an outwardly adjacent track in a zigzag shape. The burst data includes an error caused by deformation of a track with respect to a track center (target route) that is concentric to the disk 10, the deformation occurring due to deflection (repeatable run out (RRO)) that synchronizes with rotation of the disk 10 when writing the servo data on the disk. For example, the burst data is used to acquire a position of the head 15 in the disk 10 in the radial direction and/or the circumferential direction (hereinafter, may be referred to as "head position"). Hereinafter, for convenience of explanation, the error caused by the deformation, which occurs due to the RRO, of the track with respect to the track center is referred to simply as "RRO".

In each of the plurality of servo regions SV, a pattern that constitutes RRO correction data for correcting the RRO (hereinafter, referred to simply as "RRO correction data") is written. The RRO correction data is a kind of addition data of the servo data. The RRO correction data is used to correct the RRO of the servo data (more specifically, servo burst data in the servo data), that is, deformation of a route of the head 15 with respect to the track center. Correction of the RRO may be referred to as perfect circle correction.

The RRO correction data includes digital data obtained by encoding an RRO preamble pattern, a synchronization pattern, and a correction amount (hereinafter, referred to as "RRO correction code (RRO code)"). The RRO preamble pattern and the synchronization pattern are used to detect a read initiation timing of the digital data obtained by encoding the correction amount that is written in a subsequent region. At this time, the RRO correction code (RRO code) constitutes a main portion of the RRO correction data. The RRO correction data may be referred to as "RRO bit" or "post code".

In a case where the head 15 is located at the radial position RP0, a skew angle becomes, for example, 0°. Hereinafter, the radial position RP0 may be referred to as "reference position RP0". In a case where the head 15 is located at the radial position ORP, the skew angle becomes, for example, a positive value. In a case where the head 15 is located at the radial position IRP, the skew angle becomes, for example, a negative value. It should be noted that, in a case where the head 15 is located at the radial position ORP, the skew angle may be a negative value. In addition, in a case where the head 15 is located at the radial position IRP, the skew angle may be a positive value.

In the example illustrated in FIG. 2, in the case of being positioned to the radial position IRP, an operation of the head 15 is corrected to pass along the track center IIL from the route ISL based on the servo data of the servo region SV of the disk 10. In the case of being positioned to the radial position RP0, an operation of the head 15 is corrected to pass along the track center IL0 from the route SL0 based on the servo data of the serve region SV of the disk 10. In the case of being positioned to the radial position ORP, an operation of the head 15 is corrected to pass along the track center OIL from the route OSL based on the servo data of the servo region SV of the disk 10.

The driver IC 20 controls driving of the SPM 12 and the VCM 14 in accordance with control of the system controller 130 (more specifically, an MPU 60 to be described later).

The head amplifier IC (preamplifier) 30 includes a read amplifier and a write driver. The read amplifier amplifies a read signal that is read from the disk 10, and outputs the read signal to the system controller 130 (specifically, a read/write (R/W) channel 40 to be described later). The write driver outputs a write current corresponding to a signal output from the R/W channel 40 to the head 15.

The volatile memory 70 is a semiconductor memory from which stored data is lost when power supply is suspended. The volatile memory 70 stores data necessary for processes in respective units of the magnetic disk device 1, or the like. For example, the volatile memory 70 is a dynamic random access memory (DRAM), or a synchronous dynamic random access memory (SDRAM).

The nonvolatile memory 80 is a semiconductor memory that records stored data even when power supply is suspended. For example, the nonvolatile memory 80 is an NOR-type or NAND-type flash read only memory (FROM).

The buffer memory 90 is a semiconductor memory that temporarily records data that is transmitted and received between the magnetic disk device 1 and the host 100, or the like. It should be noted that, the buffer memory 90 may be constituted integrally with the volatile memory 70. Examples of the buffer memory 90 include a DRAM, a static random access memory (SRAM), an SDRAM, a ferroelectric random access memory (FeRAM), a magnetoresistive random access memory (MRAM), and the like.

For example, the system controller (controller) 130 is realized by using a large-scale integrated circuit (LSI) called a system-on-a-chip (SoC) in which a plurality of elements are integrated in a single chip. The system controller 130 includes the read/write (R/W) channel 40, a hard disk controller (HDC) 50, and a microprocessor (MPU) 60. For example, the system controller 130 is electrically connected to the driver IC 20, the head amplifier IC 30, the volatile memory 70, the nonvolatile memory 80, the buffer memory 90, and the host 100.

The R/W channel 40 executes signal processing of read data that is transferred from the disk 10 to the host 100 and write data that is transferred from the host 100 in correspondence with an instruction from the MPU 60 described later. The R/W channel 40 includes a circuit that measures signal quality of the read data or has the function. For example, the R/W channel 40 is electrically connected to the head amplifier IC 30, the HDC 50, the MPU 60, and the like.

The HDC 50 controls data transfer between the host 100 and the R/W channel 40 in correspondence with an instruction from the MPU 60 described later. For example, the HDC 50 is electrically connected to the R/W channel 40, the MPU 60, the volatile memory 70, the nonvolatile memory 80, the buffer memory 90, and the like.

The MPU 60 is a main controller that controls respective units of the magnetic disk device 1. The MPU 60 controls the VCM 14 through the driver IC 20, to execute servo control of positioning the head 15. In addition, the MPU 60 controls the SPM 12 through the driver IC 20 to rotate the disk 10. The MPU 60 controls a data write operation to the disk 10 and selects a storage destination of the write data. In addition, the MPU 60 controls of a data read operation from the disk 10 and controls processing of read data. The MPU 60 is connected to respective units of the magnetic disk device 1. For example, the MPU 60 is electrically connected to the driver IC 20, the R/W channel 40, the HDC 50, and the like.

The MPU 60 includes a read/write controller 610, an RRO learning unit 620, an RRO recording unit 630, and a position correction unit 640. The MPU 60 executes processing of the respective units, for example, the read/write controller 610, the RRO learning unit 620, the RRO recording unit 630, the position correction unit 640, and the like on firmware. It should be noted that, the MPU 60 may include the respective units, for example, the read/write controller 610, the RRO learning unit 620, the RRO recording unit 630, the position correction unit 640, and the like as a circuit.

The read/write controller 610 controls read processing and write processing of data in accordance with a command from the host 100. The read/write controller 610 controls the VCM 14 through the driver IC 20 to position the head 15 at a particular position of the disk 10, and reads or writes data. Hereinafter, "positioning or disposition of the head 15 (the write head 15W and the read head 15R) to a particular position of the disk 10, for example, a position set as a target (hereinafter, referred to as "target position") of a particular track" may be described as "positioning or disposition of the head 15 (the write head 15W or the read head 15R) to a particular track".

The RRO learning unit 620 positions the read head 15R to a particular position of the disk 10, for example, a target route of a particular track, measures a difference value (hereinafter, referred to as "RRO correction amount") between the target route and a position of the head 15 (the read head 15R) which is calculated based on a signal obtained by demodulating servo data read from the serve sector (hereinafter, may be referred to as "demodulation signal"), and calculates RRO correction data from the measurement result. Hereinafter, "a head position calculated based on a demodulation signal obtained by demodulating servo data that reads a particular servo sector" may be referred to as "servo demodulation position" or "demodulation position". "Measurement of the RRO correction amount" or "calculation of the RRO data based on the RRO correction amount" may be referred to as "RRO learning". "RRO learning" may be referred to simply as "measurement", "reading", "acquisition", or the like. The RRO correction amount and the RRO correction data may be used as the same meaning. A particular radial position at which the RRO learning is executed, and a particular radial position at which the RRO learning has been executed may be referred to as "learning position". For example, the learning position corresponds to a distance between a target position of a particular track, for example, a track center, and a particular radial position at which the RRO learning has been executed. In addition, the RRO learning unit 620 may acquire RRO learning position information in the circumferential direction. For example, the RRO learning unit 620 executes an RRO learning process in a test stage or a product stage of the magnetic disk device 1. It should be noted that, with regard to the particular radial position, the RRO learning unit 620 may execute the RRO learning at several positions in the circumferential direction, or may execute the RRO learning at all positions in the circumferential direction. In addition, the RRO learning unit 620 may execute the RRO learning at several radial positions or may execute the RRO learning at all radial positions of the disk 10.

To estimate a variation of the RRO correction amount of the disk 10 in the radial direction (hereinafter, referred to as "RRO variation" or "variation of an RRO correction amount") in a particular region in the radial direction (hereinafter, referred to as "radial region") in the disk 10 based on a plurality of RRO correction amounts which respectively correspond to a plurality of learning positions, and to correct a head position based on the estimated variation of the RRO correction amount in the radial region, the RRO learning unit 620 executes the RRO learning at a plurality of radial positions in the radial region. For example, a variation gradient of the RRO varies for every track. For example, the RRO learning unit 620 executes the RRO learning at a plurality of radial positions in the radial region of the disk 10 at which it is possible to execute a process of estimating a variation of the RRO correction amount in a corresponding region based on two pieces of RRO correction amounts acquired at two learning positions, and of correcting the radial position of the head 15 based on the estimated variation of the RRO correction amount. Hereinafter, the "process of estimating a variation of the RRO correction amount in a corresponding region based on two pieces of RRO correction amounts which are respectively acquired at two learning positions in the radial region and of correcting the head position based on the estimated variation of the RRO correction amount" may be referred to as a "linear RRO correction process". It should be noted that, in the linear RRO correction process, a variation of the RRO correction amount may be estimated based on three or more pieces of RRO correction amounts which are respectively acquired at three or more learning positions in the radial region, and the head position may be corrected based on the estimated variation of the RRO correction amount.

To improve accuracy of the linear RRO correction process, the RRO learning unit 620 sets a learning position that is used in the linear RRO correction process (hereinafter, referred to as "linear learning position") based on an error between information corresponding to an ideal route (or, an arrangement of the servo data) of the head 15 which is acquired by demodulating servo data in a radial region (or a plurality of tracks), for example, two adjacent tracks, and information corresponding to a route of the head 15 which is actually acquired by demodulating the servo data in the radial region. Hereinafter, "information corresponding to an ideal route (or, an arrangement of the servo data) of the head 15 which is acquired by demodulating servo data in a radial region" may be referred to as "an ideal servo demodulation scale" or "target scale". The target scale corresponds to a plurality of radial positions (hereinafter, referred to as a servo offset amount) set as a target in the radial region. "Information corresponding to a route of the head 15 which is actually acquired by demodulating the servo data in the radial region" may be referred to as "actual servo demodulation scale" or "measurement scale". The measurement scale corresponds to a plurality of radial positions (servo offset amount) in the radial region at which the servo data is actually read. For example, the measurement scale includes distortion of each track in the radial region in the radial direction, or the like (hereinafter, may be referred to as nonlinearity of a servo demodulation scale or nonlinearity of a scale). According to this, the measurement scale vary fluctuates with respect to the target scale. Hereinafter, an error between the target scale and the measurement scale is referred to as "linearity error". For example, the linearity error is an index indicating a distortion of a radial region, for example, a particular track.

The RRO learning unit 620 has a function of correcting the linearity error, a value related to the linearity error, or the like in the course of calculating a servo demodulation position based on a demodulation signal obtained by demodulating servo data read from the servo region SV, and a function of adjusting parameters for correcting the linearity error. Hereinafter, "correction of the linearity error" may be referred to as "linearity correction". In addition, "adjustment of parameters for correcting the linearity error" may be referred to as "linearity adjustment". The RRO learning unit 620 calculates various parameters which are used in calculation for correcting various values related to the servo demodulation position in the course of calculating the servo demodulation position. For example, the RRO learning unit 620 calculates various parameters which are used in the linearity correction (hereinafter, referred to as "correction parameters" or "linearity correction parameters") in the course of calculating the servo demodulation position. The RRO learning unit 620 adjusts the correction parameters in the course of calculating the correction parameters. Hereinafter, "calculation of correction parameters" may be noted as "adjustment of correction parameters". In addition, "adjustment of correction parameters" may be noted as "calculation of correction parameters". The RRO learning unit 620 executes adjustment of the correction parameters, for example, in a manufacturing process. The RRO learning unit 620 sets the linear learning position, for example, based on the correction parameters or the magnitude of the linearity correction error. It should be noted that, the RRO learning unit 620 may record the correction parameters which are calculated in the course of calculating the servo demodulation position, for example, in the course of correcting the linearity in a particular recording region, for example, the disk 10, the nonvolatile memory 80, or the like. Adjustment of the correction parameters may be for every head or zone.

Hereinafter, the linearity error will be described with reference to FIG. 3, FIG. 4, FIG. 5, and FIG. 6.

FIG. 3 is a schematic view illustrating an example of a configuration of the servo region SV. In FIG. 3, a track TRn and a track TRn+1 which are continuously arranged in the radial direction are illustrated. The track TRn includes a track center TRCn. The track TRn+1 includes a track center TRCn+1. It should be noted that, for convenience of explanation, the tracks TRn and TRn+1 linearly extend in the circumferential direction, but are actually curved along the circumferential direction of the disk 10. The tracks TRn and TRn+1 may extend in the circumferential direction in a wave form while periodically fluctuating. In addition, the tracks TRn and TRn+1 may be slightly spaced away from each other in the radial direction, and parts thereof may overlap each other.

In the example illustrated in FIG. 3, the servo region SV includes a preamble, a servo mark, a gray code, a PAD, an N burst, a Q burst, and a post code, and the like. The preamble includes preamble information to synchronize with a reproduction signal of a servo pattern. The servo mark includes servo mark information indicating initiation of the servo pattern. The gray code includes gray code information indicating a servo sector number, a track (cylinder) number, or the like. The PAD includes PAD information of a synchronization signal such as a gap and a servo AGC. The N burst and the Q burst include burst information indicating a relative position of the head 15 (the write head 15W and the read head 15R) with respect to a track in the radial direction. The post code includes RRO correction data. It should be noted that, the post code may not be included in the servo region SV.

In the example illustrated in FIG. 3, the RRO learning unit 620 demodulates the gray code, the N burst, the Q burst, and the post code which are read by the read head 15R at a radial position of the servo mark, for example, at the track center TRCn of the track TRn and are continuous in the circumferential direction of the servo mark information, and detects the demodulated radial position of the read head 15R as a servo demodulation position. The RRO learning unit 620 may record information such as the servo demodulation position that is detected in a particular recording region, for example, the disk 10, the nonvolatile memory 80, or the like.

FIG. 4 is a view illustrating an example of a Lissajous waveform by a demodulation signal (or demodulation data) obtained by demodulating burst data read from the N burst, and a demodulation signal obtained by demodulating burst data read from the Q burst. In FIG. 4, the horizontal axis represents a demodulation signal or demodulation data (hereinafter, referred to as "N burst demodulation signal") obtained by demodulating burst data (hereinafter, may be referred to as "N burst data") read from the N burst by the read head 15R at a particular position (a particular radial position or a particular circumferential position), and the vertical axis represents a demodulation signal or demodulation data (hereinafter, referred to as "Q burst demodulation signal") obtained by demodulating burst data (hereinafter, may be referred to as "Q burst data") read from the Q burst by the read head 15R at a particular position. For example, the N burst demodulation signal corresponds to a demodulation position obtained by demodulating the N burst data read from the N burst, and corresponds to a deviation amount (hereinafter, referred to as an off-track amount) from the track center (or a target position) of a track corresponding to the read N burst data to the radial direction. For example, the Q burst demodulation signal corresponds to a demodulation position obtained by demodulating the Q burst data read from the Q burst, and corresponds to an off-track amount from the track center (or a target position) of a track corresponding to the read Q burst data to the radial direction. In FIG. 4, the origin O (0, 0) at which the N burst demodulation signal is 0, and the Q burst demodulation signal is 0 is illustrated. In the horizontal axis in FIG. 4, as it goes toward a "positive" arrow direction from the origin O, the N burst demodulation signal becomes larger in a positive value direction, and as it goes toward a "negative" arrow direction from the origin O, the N burst demodulation signal becomes smaller in a negative value direction. In the vertical axis in FIG. 4, as it goes toward a "positive" arrow direction from the origin O, the Q burst demodulation signal becomes larger in a positive value direction, and as it goes toward a "negative" arrow direction from the origin O, the Q burst demodulation signal becomes smaller in a negative value direction. In FIG. 4, a Lissajous waveform (or a Lissajous figure) LF corresponding to the radial region is illustrated. For example, the Lissajous waveform LF per one round corresponds to a plurality of N burst demodulation signals and a plurality of Q burst demodulation signals which respectively correspond to a plurality of positions (a plurality of radial positions and a plurality of circumferential positions) in a radial region corresponding to two servo tracks. Here, for example, the two servo tracks correspond to a width of two continuous tracks in the radial direction. For example, the Lissajous waveform LF per one round corresponds to a plurality of N burst demodulation signals and a plurality of Q burst demodulation signals which are respectively read at a plurality of positions in a radial region corresponding to the tracks TRn and TRn+1 illustrated in FIG. 3. In FIG. 4, a plurality of points which form the Lissajous waveform LF correspond to a plurality of N burst demodulation signals and a plurality of Q burst demodulation signals which respectively correspond to a plurality of positions in the radial region. It should be noted that, the Lissajous waveform may be formed at least one side of the plurality of N burst demodulation signals and the plurality of Q burst demodulation signals which correspond to the plurality of positions in the radial region.

In the example illustrated in FIG. 4, the Lissajous waveform LF has an approximately circular shape. In a case where the Lissajous waveform LF has a circular shape, the linearity error may become small. In a case where the Lissajous waveform LF has a square shape, the linearity error may become large. The RRO learning unit 620 may acquire the Lissajous waveform LF based on a demodulation signal obtained by demodulating data that is read at each position in the radial region corresponding to at least two servo tracts. In addition, the RRO learning unit 620 may record the acquired Lissajous waveform LF in a particular recording region, for example, the disk 10, the nonvolatile memory 80, or the like.

Figure 5:
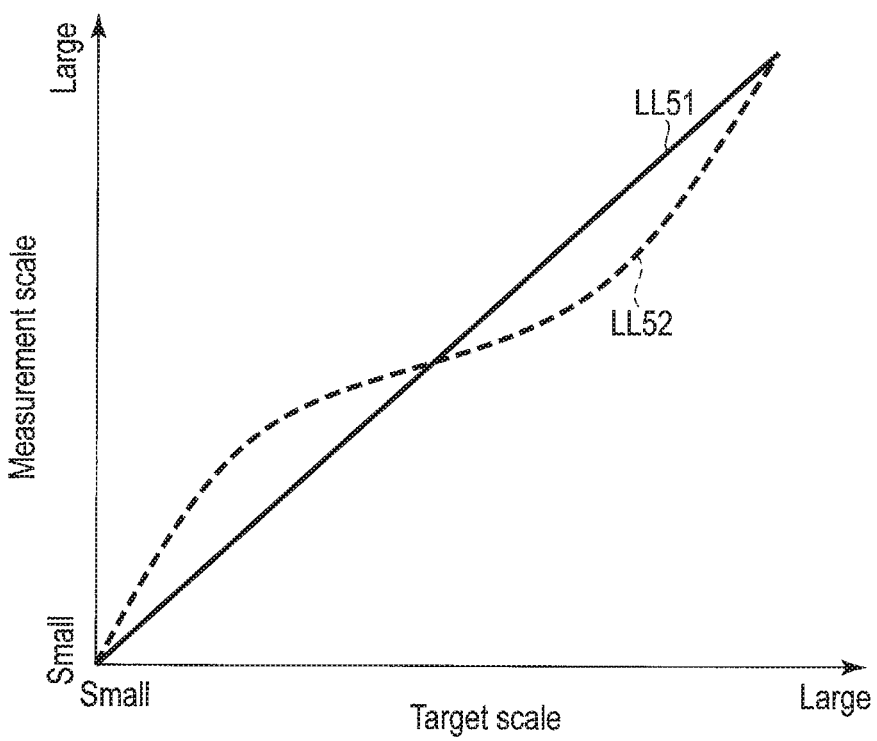
FIG. 5 is a view illustrating an example of a relationship between a target scale and a measurement scale.

FIG. 5 is a view illustrating an example of a relationship between a target scale and a measurement scale. In FIG. 5, the horizontal axis represents the target scale, and the vertical axis represents the measurement scale based on the Q burst demodulation signal and the N burst demodulation signal which are acquired through measurement in the radial region. In the horizontal axis, as it goes toward a "large" arrow, the target scale becomes larger, and as it goes toward a "small" arrow, the target scale becomes smaller. In the vertical axis, as it goes toward a "large" arrow, the measurement scale becomes larger, and as it goes toward a "small" arrow, the measurement scale becomes smaller. In FIG. 5, a line LL51 and a broken line LL52 are illustrated. The line LL51 and the broken line LL52 represent a relationship between the target scale and the measurement scale.

In the example illustrated in FIG. 5, the line LL51 represents that the measurement scale and the target scale have a proportional relationship. That is, the line LL51 represents that the linearity error does not occur. The broken line LL52 represents that the measurement scale and the target scale have a nonlinear relationship. That is, the broken line LL52 represents that the linearity error occurs. For example, the RRO learning unit 620 calculates the measurement scale based on the Q burst demodulation signal and the N burst demodulation signal, and calculates the relationship LL51 and LL52 between the target scale and the measurement scale based on the measurement scale and the target scale which are calculated.

Figure 6:
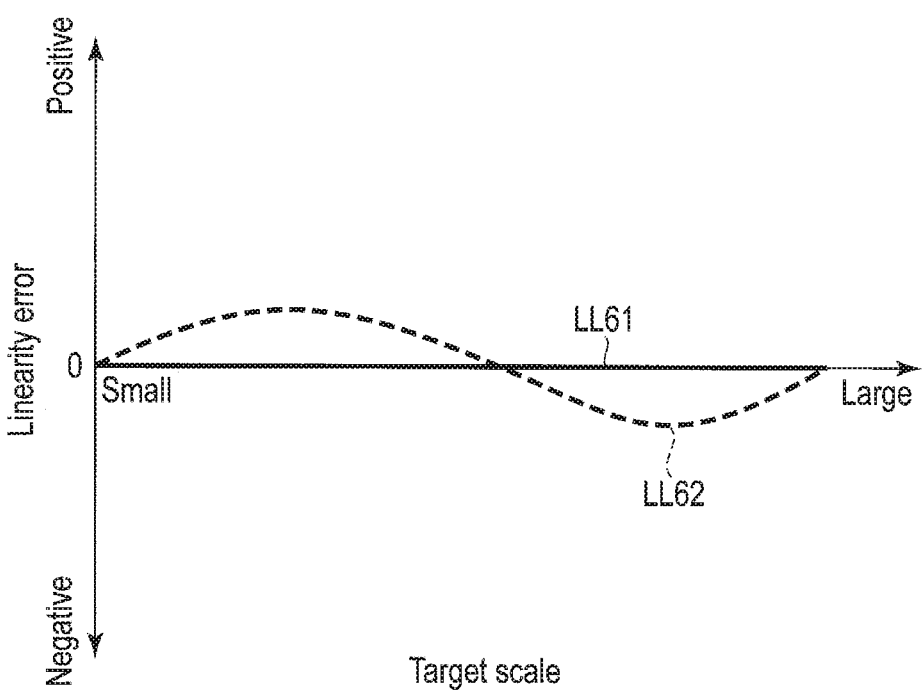
FIG. 6 is a schematic view illustrating an example of a linearity error.

FIG. 6 is a schematic view illustrating an example of the linearity error. In FIG. 6, the horizontal axis represents the target scale, and the vertical axis represents the linearity error. In the horizontal axis, as it goes toward a "large" arrow, the target scale becomes larger, and as it goes toward a "small" arrow direction, the target scale becomes smaller. In the vertical axis, as it goes toward a "positive" arrow from the origin O, the linearity error becomes larger in a positive value direction, and as it goes toward a "negative" arrow from the origin O, the linearity error becomes smaller in a negative value direction. In FIG. 6, a line LL61 and a broken line LL62 are illustrated. The line LL61 and the broken line LL62 represent a relationship between the target scale and the linearity error. The line LL61 corresponds to the line LL51 illustrated in FIG. 5, and the broken line LL62 corresponds to the broken line LL52 illustrated in FIG. 5.

As illustrated by the relationship LL62 between the target scale and the linearity error in FIG. 6, in a case where the linearity error occurs, the RRO learning unit 620 executes linearity correction in the course of calculating a demodulation position. The RRO learning unit 620 corrects the N burst demodulation signal or the Q burst demodulation signal in the linearity correction. For example, the RRO learning unit 620 sets correction parameters for correcting the N burst demodulation signal or the Q burst demodulation signal. The RRO learning unit 620 executes the linearity correction based on the correction parameters to calculate the demodulation position. Examples of the linearity correction includes correction of a phase corresponding to a demodulation signal obtained by demodulating servo data read from the servo sector (hereinafter, may be referred to as "initial phase correction"), correction of a waveform deviation of the demodulation signal obtained by demodulating the servo data read from the servo sector (hereinafter, may be referred to as "demodulation signal offset correction" or "offset correction"), correction of a deviation of a Lissajous waveform corresponding to the demodulation signal in a rotation direction (hereinafter, may be referred to as "rotation deviation correction" or "rotation correction"), correction of a demodulation position based on a particular parameter (hereinafter, referred to as gamma (γ)) (hereinafter, may be referred to as "gamma correction" or "gamma demodulation"), correction of a demodulation position based on a table corresponding to a deviation (hereinafter, may be referred to as "scale error") of the measurement scale with respect to the target scale at each position of the radial region (hereinafter, may be referred to as "table correction"). For example, the demodulation signal offset corresponds to a deviation of the center of the Lissajous waveform with respect to the origin. Gamma, which is adjusted so that the scale error becomes optimal, for example, minimum, represents whether the linearity error after adjustment in the radial region is to be large or small. For example, as the gamma becomes larger, the linearity error of the radial region becomes larger, and as the gamma becomes smaller, the linearity error of the radial region becomes smaller. That is, as the gamma becomes larger, the Lissajous waveform in the radial region becomes closer to a square shape, and as the gamma becomes smaller, the Lissajous waveform in the radial region becomes closer to a circular shape. In other words, as the gamma becomes larger, a ratio of the maximum amplitude to the minimum amplitude in the Lissajous waveform in the radial region becomes greater than 1. As the gamma becomes smaller, the ratio of the maximum amplitude to the minimum amplitude in the Lissajous waveform in the radial region approaches 1. It should be noted that, the linearity correction may include correction of a speed of the head 15 (arm 13) (hereinafter, may be referred to as "speed") when reading the N burst and the Q burst (hereinafter, may be referred to as "speed correction"). The correction parameters include a correction value that is used in the initial phase correction (hereinafter, referred to as "initial correction value"), a correction value that is used in the demodulation signal offset correction (hereinafter, referred to as "demodulation signal offset correction value" or "offset correction value"), a correction value that is used in the rotation deviation correction (hereinafter, referred to as "rotation correction value"), gamma that is used in the gamma correction (hereinafter, referred to as "gamma correction value"), and a correction value that is used in the table correction (hereinafter, referred to as "table correction value"). It should be noted that, the correction parameters may include a correction value that is used in the speed correction (hereinafter, referred to as "speed correction value"). The RRO learning unit 620 records the various correction parameters in a particular recording region, for example, the disk 10 or the nonvolatile memory 80. In addition, the various correction parameters may be parameters which are adjusted for every head or zone. For example, the RRO learning unit 620 makes the linearity error be small by adjusting the gamma as a correction parameter for every head or zone.

Hereinafter, an example of a method of adjusting the correction parameters which are used in correction of the linearity error will be described with reference to FIG. 7, FIG. 8, FIG. 9, FIG. 10, FIG. 11, FIG. 12, FIG. 13, FIG. 14, FIG. 15, and FIG. 16.

(Setting of Demodulation Route)

In the case of calculating the linearity correction parameters, the RRO learning unit 620 sets a route (hereinafter, referred to as "read route" or "demodulation route") of the head 15 that reads (or demodulates) servo data to include a range corresponding to the target scale, for example, a range of two or more servo tracks in the radial direction, and reads (or demodulates) the servo data along the demodulation route that is set. For example, the RRO learning unit 620 sets the demodulation route in which an average of linearity errors over all routes becomes zero.

FIG. 7 is a view illustrating an example of the route of the head 15 that reads the servo data for calculating the correction parameters. In FIG. 7, the horizontal axis represents the circumferential direction and the vertical axis represents the radial direction. In FIG. 7, sectors Sct 1N, Sct 2N, Sct 3N, Sct 4N, and Sct 5N which are continuously arranged in the circumferential direction are illustrated in the horizontal axis. In FIG. 7, tracks Trk 1M, Trk 2M, Trk 3M, Trk 4M, Trk 5M, Trk 6M, Trk 7M, and Trk 8M which are continuously arranged in the radial direction are illustrated in the vertical axis. In FIG. 7, a route (demodulation route) RT71 of the head 15 in the case of reading the servo data is illustrated.

In the example illustrated in FIG. 7, the RRO learning unit 620 sets the demodulation route RT71 from a position at which read is initiated (hereinafter, referred to as "read initiation position") to a read termination position that is set to be the same as the read initiation position (hereinafter, referred to as "read termination position") by crossing a plurality of tracks and going around the disk 10 by one round. Hereinafter, a demodulation route of performing read from the read initiation position to the read termination position that is set to be the same as the read initiation position by crossing the plurality of tracks and going around the disk 10 by one round so as to calculate the correction parameters may be referred to as a virtual circle orbit or a sine wave (sinusoidal wave) orbit. It should be noted that, the RRO learning unit 620 may set a demodulation route in which crossing is performed from an inner peripheral side (or an outer peripheral side) to the outer peripheral side (or the inner peripheral side) of the disk 10 in a spiral shape. In addition, a plurality of the demodulation routes along which the servo data is read may exist at positions which are deviated in the radial direction. In addition, a track crossing amount (amplitude of the sine wave orbit) of the demodulation track and a radial position (a phase of the sine wave orbit) of the read initiation position may vary for every head or zone.

The RRO learning unit 620 demodulates the servo data that is read along the demodulation route by the R/W channel 40, and records the demodulation data in a particular recording region, for example, the volatile memory 70, the nonvolatile memory 80, the buffer memory 90, the disk 10, or the like. For example, the RRO learning unit 620 demodulates burst data (N burst data and Q burst data) which are read from the N burst and the Q burst along the demodulation route by the R/W channel 40 through Discrete Fourier transform (DFT) processing. The RRO learning unit 620 records a sine component (hereinafter, referred to as "N sine component") and a cosine component (hereinafter, referred to as "N cosine component") of the N burst demodulation signal obtained by demodulating the burst data read from the N burst through the DFT processing, and a sine component (hereinafter, referred to as "Q sine component") and a cosine component (hereinafter, referred to as "Q cosine component") of the Q burst demodulation signal obtained by demodulating the Q burst data read from the Q burst through the DFT processing in a particular recording region, for example, the volatile memory 70, the nonvolatile memory 80, the buffer memory 90, the disk 10, or the like. It should be noted that, in a case where correspondence is established in calculation and output of an amplitude amp=sqrt(sine component^2+cosine component^2), and a phase phs=arctan (sine component/cosine component), the R/W channel 40 may acquire the amplitude amp and the phase phs as a change of the sine component and the cosine component. In a case where the sine component and the cosine component are necessary, calculation may be performed from amp×sin (phs), and amp×cos(phs).

(Adjustment Method of Initial Phase Correction Value)

The RRO learning unit 620 reads the servo data from the servo sector along the demodulation route, calculates an initial phase correction value corresponding to a demodulation signal obtained by demodulating the read servo data, and corrects an initial phase of the demodulation signal based on the initial phase correction value that is calculated (adjusted). The RRO learning unit 620 corrects the linearity error by correcting the initial phase based on the initial phase value that is set. For example, the RRO learning unit 620 reads the N burst and the Q burst along the demodulation route, calculates a plurality of initial correction values which respectively correspond to the N burst demodulation signal and the Q burst demodulation signal, and corrects an initial phase of the N burst demodulation signal and an initial phase of the Q burst demodulation signal based on the plurality of initial phase correction values which are calculated.

Hereinafter, the correction method of the initial phase correction value will be described with reference to FIG. 8 and FIG. 9.

Figure 8:
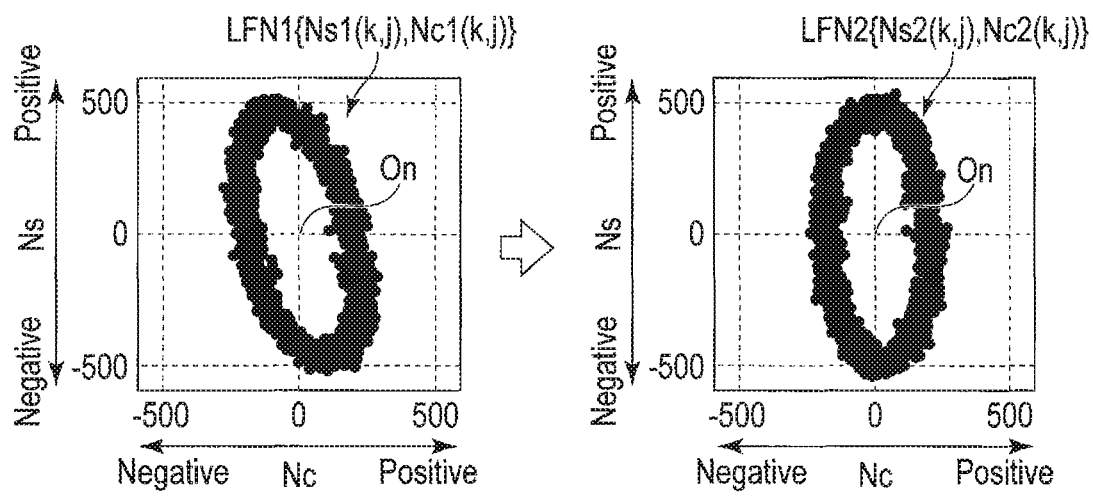
FIG. 8 is a view illustrating an example of a Lissajous waveform corresponding to an N burst demodulation signal.

FIG. 8 is a view illustrating an example of a Lissajous waveform corresponding to the N burst demodulation signal. In FIG. 8, the origin On in which an N sine component is zero, and an N cosine component is zero is illustrated. In FIG. 8, the vertical axis represents an N sine component Ns and the horizontal axis represents an N cosine component Nc. In the vertical axis in FIG. 8, the N sine component Ns becomes larger in a positive value direction as it goes toward a "positive" arrow direction from the origin On, and becomes smaller in a negative value direction as it goes toward a "negative" arrow direction from the origin On. In the horizontal axis in FIG. 8, the N cosine component Nc becomes larger in a positive value direction as it goes toward a "positive" arrow direction from the origin On, and becomes smaller in a negative value direction as it goes toward a "negative" arrow direction from the origin On. FIG. 8 illustrates a Lissajous waveform LFN1{Ns1($k$, $j$), Nc1($k$, $j$)} corresponding to an N burst demodulation signal N1($k$, $j$) before initial phase correction, and a Lissajous waveform LFN2{Ns2($k$, $j$), Nc2($k$, $j$)} corresponding to an N burst demodulation signal N2($k$, $j$) after initial phase correction. One round of the Lissajous waveform LFN1 corresponds to a plurality of the N burst demodulation signals N1($k$, $j$) which respectively correspond to a plurality of positions in a radial region corresponding to two servo tracks. For example, the one round of the Lissajous waveform LFN1 corresponds to the plurality of N burst demodulation signals N1($k$, $j$) which respectively correspond to a plurality of positions in the radial region of the tracks TRn and TRn+1 illustrated in FIG. 3. In the example illustrated in FIG. 8, the Lissajous waveform LFN1 has an elliptical shape. The Lissajous waveform LFN1 is inclined around the origin On. In other words, the minor axis of the Lissajous waveform LFN1 is not parallel to the horizontal axis in FIG. 8, and the major axis of the Lissajous waveform LFN1 is not parallel to the vertical axis in FIG. 8. One round of the Lissajous waveform LFN2 corresponds to a plurality of the N burst demodulation signals N2($k$, $j$) which respectively correspond to a plurality of positions in a radial region corresponding to two servo tracks. For example, the one round of the Lissajous waveform LFN2 corresponds to the plurality of N burst demodulation signals N2($k$, $j$) which respectively correspond to a plurality of positions in the radial region of the tracks TRn and TRn+1 illustrated in FIG. 3. The Lissajous waveform LFN2 has an elliptical shape. The Lissajous waveform LFN2 is not inclined around the origin On. In other words, the minor axis of the Lissajous waveform LFN2 is parallel to the horizontal axis in FIG. 8, and the major axis of the Lissajous waveform LFN2 is parallel to the vertical axis in FIG. 8. An N sine component Ns1($k$, $j$) is an N sine component Ns corresponding to the Lissajous waveform LFN1, and an N cosine component Nc1($k$, $j$) is an N cosine component Nc corresponding to the Lissajous waveform LFN1. An N sine component Ns2($k$, $j$) is an N sine component Ns corresponding to the Lissajous waveform LFN2, and an N cosine component Nc2($k$, $j$) is an N cosine component Nc corresponding to the Lissajous waveform LFN2. Here, k is a value corresponding to a radial position, for example, a number representing the order of radial positions at which the servo data is read in a particular radial region, and j is a value corresponding to a circumferential position, for example, a number representing the order of radial positions at which the servo data is read in a particular radial region.

In the example illustrated in FIG. 8, the RRO learning unit 620 corrects the Lissajous waveform LFN1 that is acquired based on the N sine component Ns1($k, j$) and the N cosine component Nc1($k, j$) to the Lissajous waveform LFN2, and calculates the N sine component Ns2($k, j$) and the N cosine component Nc2($k, j$) which correspond to the Lissajous waveform LFN2. The RRO learning unit 620 calculates an initial phase correction value for correcting the N burst demodulation signal N1 to the N burst demodulation signal N2 based on the N sine component Ns1($k, j$), the N cosine component Nc1($k, j$), the N sine component Ns2($k, j$), and the N cosine component Nc2($k, j$).

For example, the RRO learning unit 620 calculates an amplitude Namp and a phase Nphs of the N burst demodulation signal N1 by the following expressions.

$$Namp = \operatorname{sqrt}(Ns1(k,j)^2 + Nc1(k,j)^2) \qquad (1)$$

$$Nphs = \arctan(Ns1(k,j)/Nc1(k,j)) \qquad (2)$$

The RRO learning unit 620 calculates a plurality of amplitudes Namp and a plurality of phases Nphs of a plurality of N burst demodulation signals N1 which respectively correspond to a plurality of positions in the radial region by Expressions (1) and (2), and calculates a phase CNphs, which corresponds to the largest amplitude (hereinafter, may be referred to as "maximum amplitude") among the plurality of amplitudes Namp which are calculated, among the plurality of phases Nphs as the initial phase correction value. The RRO learning unit 620 calculates the initial phase correction value CNphs by the following expression.

$$CNphs = Nphs\{MAX(Namp)\} \qquad (3)$$

The RRO learning unit 620 corrects the Lissajous waveform LFN1 to the Lissajous waveform LFN2 based on the initial phase correction value CNphs and calculates the N sine component Ns2($k, j$) and the N cosine component Nc2($k, j$) which correspond to the Lissajous waveform LFN2. In addition, the RRO learning unit 620 corrects the N burst demodulation signal N1 to the N burst demodulation signal N2 based on the initial phase correction value CNphs by the following Expression (4).

$$N2 = Nc1(k,j) \times \sin(CNphs) + Ns1(k,j) \times \cos(CNphs) \qquad (4)$$

It should be noted that, the RRO learning unit 620 may calculate a particular phase, which corresponds to the maximum amplitude among the plurality of amplitudes Namp which respectively corresponding to a plurality of circumferential positions, among the plurality of phases Nphs for every radial position. The RRO learning unit 620 may acquire a phase obtained by averaging a plurality of particular phases calculated for every radial position as the initial phase correction value CNphs.

Figure 9:
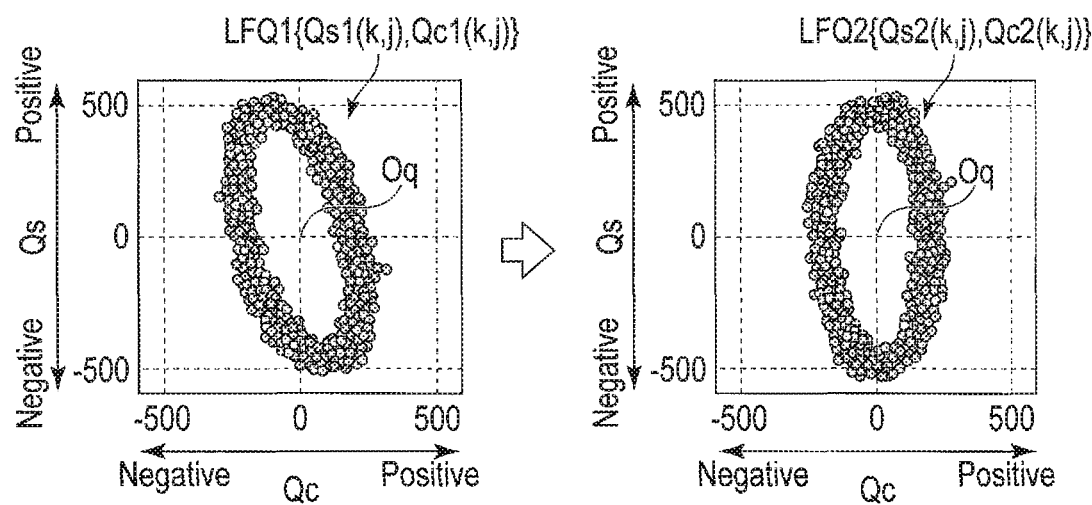
FIG. 9 is a view illustrating an example of a Lissajous waveform corresponding to a Q burst demodulation signal.

FIG. 9 is a view illustrating an example of a Lissajous waveform corresponding to the Q burst demodulation signal. In FIG. 9, the origin Oq in which a Q sine component is zero, and a Q cosine component is zero is illustrated. In FIG. 9, the vertical axis represents a Q sine component Qs and the horizontal axis represents a Q cosine component Qc. In the vertical axis in FIG. 9, the Q sine component Qs becomes larger in a positive value direction as it goes toward a "positive" arrow direction from the origin Oq, and becomes smaller in a negative value direction as it goes toward a "negative" arrow direction from the origin Oq. In the horizontal axis in FIG. 9, the Q cosine component Qc becomes larger in a positive value direction as it goes toward a "positive" arrow direction from the origin Oq, and becomes smaller in a negative value direction as it goes toward a "negative" arrow direction from the origin Oq. FIG. 9 illustrates a Lissajous waveform LFQ1{Qs1($k, j$), Qc1($k, j$)} corresponding to a Q burst demodulation signal Q1($k, j$) before initial phase correction, and a Lissajous waveform LFQ2{Qs2($k, j$), Qc2($k, j$)} corresponding to a Q burst demodulation signal Q2($k, j$) after initial phase correction. One round of the Lissajous waveform LFQ1 corresponds to a plurality of the Q burst demodulation signals Q1($k, j$) which respectively correspond to a plurality of positions in a radial region corresponding to two servo tracks. For example, the one round of the Lissajous waveform LFQ1 corresponds to the plurality of Q burst demodulation signals Q1($k, j$) which respectively correspond to a plurality of positions in the radial region of the tracks TRn and TRn+1 illustrated in FIG. 3. In the example illustrated in FIG. 9, the Lissajous waveform LFQ1 has an elliptical shape. The Lissajous waveform LFQ1 is inclined around the origin On. In other words, the minor axis of the Lissajous waveform LFQ1 is not parallel to the horizontal axis in FIG. 9, and the major axis of the Lissajous waveform LFQ1 is not parallel to the vertical axis in FIG. 9. One round of the Lissajous waveform LFQ2 corresponds to information related to a plurality of the Q burst demodulation signals Q2($k, j$) which respectively correspond to a plurality of positions in a radial region corresponding to two servo tracks. For example, the one round of the Lissajous waveform LFQ2 corresponds to information related to the Q burst demodulation signals Q2($k, j$) which respectively correspond to a plurality of positions in the radial region of the tracks TRn and TRn+1 illustrated in FIG. 3. The Lissajous waveform LFQ2 has an elliptical shape. The Lissajous waveform LFQ2 is inclined around the origin Oq. In other words, the minor axis of the Lissajous waveform LFQ2 is parallel to the horizontal axis in FIG. 9, and the major axis of the Lissajous waveform LFQ2 is parallel to the vertical axis in FIG. 9. A Q sine component Qs1($k, j$) is a Q sine component Qs corresponding to the Lissajous waveform LFQ1, and a Q cosine component Qc1($k, j$) is a Q cosine component Qc corresponding to the Lissajous waveform LFQ1. A Q sine component Qs2($k, j$) is a Q sine component Qs corresponding to the Lissajous waveform LFQ2, and a Q cosine component Qc2($k, j$) is a Q cosine component Qc corresponding to the Lissajous waveform LFQ2.

In the example illustrated in FIG. 9, the RRO learning unit 620 corrects the Lissajous waveform LFQ1 that is acquired based on the Q sine component Qs1($k, j$) and the Q cosine component Qc1($k, j$) to the Lissajous waveform LFQ2, and calculates the Q sine component Qs2($k, j$) and the Q cosine component Qc2($k, j$) which correspond to the Lissajous waveform LFQ2. The RRO learning unit 620 calculates an initial phase correction value for correcting the Q burst demodulation signal Q1 to the Q burst demodulation signal Q2 based on the Q sine component Qs1($k, j$), the Q cosine component Qc1($k, j$), the Q sine component Qs2($k, j$), and the Q cosine component Qc2($k, j$).

For example, the RRO learning unit 620 calculates an amplitude Qamp and a phase Qphs of Q burst demodulation signal Q1 by the following expressions.

$$Qamp = \operatorname{sqrt}(Qs1(k,j)^2 + Qc1(k,j)^2) \qquad (5)$$

$$Qphs = \arctan(Qs1(k,j)/Qc1(k,j)) \qquad (6)$$

The RRO learning unit 620 calculates a plurality of amplitudes Qamp and a plurality of phases Qphs of a plurality of Q burst demodulation signals Q1 which respectively correspond to a plurality of positions in the radial region by Expressions (5) and (6), and calculates a phase CQphs, which corresponds to the maximum amplitude among the plurality of amplitudes Qamp which are calculated, among the plurality of phases Qphs as the initial phase correction value. The RRO learning unit 620 calculates the initial phase correction value CQphs by the following expression.

$$CQphs=Qphs\{MAX(Qamp)\} \quad (7)$$

The RRO learning unit 620 corrects the Lissajous waveform LFQ1 to the Lissajous waveform LFQ2 based on the initial phase correction value CQphs and calculates the Q sine component Qs2($k$, $j$) and the Q cosine component Qc2($k$, $j$) which correspond to the Lissajous waveform LFQ2. In addition, the RRO learning unit 620 corrects the Q burst demodulation signal Q1 to the Q burst demodulation signal Q2 based on the initial phase correction value CQphs by the following Expression (8).

$$Q2=Qc1(k,j) \times \sin(CQphs)+Qs1(k,j) \times \cos(CQphs) \quad (8)$$

It should be noted that, the RRO learning unit 620 may calculate a particular phase, which corresponds to the maximum amplitude among the plurality of amplitudes Qamp which respectively corresponding to a plurality of circumferential positions, among the plurality of phases Qphs for every radial position. The RRO learning unit 620 may acquire a phase obtained by averaging a plurality of particular phases calculated for every radial position as the initial phase correction value CQphs. The initial phase correction value CQphs may be the same as or different from the initial phase correction phase CNphs. In addition, the RRO learning unit 620 may demodulate the servo data that is read from the servo sector, and may correct an initial phase of a demodulation signal that is demodulated by firmware, or the like. In this case, the RRO learning unit 620 may not calculate the initial phase correction value, and may record the demodulation signal of which the initial phase is corrected, for example, the N burst demodulation signal and the Q burst demodulation signal in a particular stage region, for example, in the volatile memory 70, the nonvolatile memory 80, the buffer memory 90, the disk 10, or the like.

(Adjustment Method of Offset Correction Value)

The RRO learning unit 620 calculates (adjusts) an offset correction value corresponding to a demodulation signal, and corrects a demodulation signal offset corresponding to the demodulation signal based on the offset correction value that is calculated (adjusted). The RRO learning unit 620 corrects the linearity error by correcting the demodulation signal offset based on the adjusted offset correction value. For example, the RRO learning unit 620 calculates a plurality of offset correction values which respectively correspond to an N burst demodulation signal and a Q burst demodulation signal of which an initial phase is corrected, and corrects the demodulation signal offset corresponding to the N burst demodulation signal and the Q burst demodulation signal based on the plurality of offset correction values which are calculated.

For example, the RRO learning unit 620 calculates an average value of a plurality of N burst demodulation signals N2($k$, $j$) which respectively correspond to a plurality of positions in the radial region as an offset correction value CNOf by the following expression.

$$CNOf=\Sigma N2(k,j)/TN2 \quad (9)$$

Here, TN2 represents a total number of the N burst demodulation signals N2($k$, $j$).

The RRO learning unit 620 corrects the N burst demodulation signal N2 to an N burst demodulation signal N3 based on the offset correction value CNOf by the following expression.

$$N3=N2-CNOf \quad (10)$$

The RRO learning unit 620 calculates an average value of a plurality of Q burst demodulation signals Q2($k$, $j$) which respectively correspond to a plurality of positions in the radial region as an offset correction value CQOf by the following expression.

$$CQOf=EQ2(k,j)/TQ2 \quad (11)$$

Here, TQ2 represents a total number of the Q burst demodulation signals Q2($k$, $j$).

The RRO learning unit 620 corrects the Q burst demodulation signal Q2 to a Q burst demodulation signal Q3 based on the offset correction value CQOf by the following expression.

$$Q3=Q2-CQOf \quad (12)$$

It should be noted that, the offset correction value CQOf may be the same as or different from the offset correction value CNOf. In a case where the offset correction values CNOf and CQOf become zero, the RRO learning unit 620 may not correct the demodulation signal offset. In addition, the RRO learning unit 620 may calculate a correction value (hereinafter, referred to as "speed correction value") for correcting a deviation (hereinafter, referred to as "speed deviation") in a waveform of a demodulation signal corresponding to a speed of the head 15 (the arm 13) when reading servo data corresponding to a demodulation signal of which the initial phase and the demodulation signal offset are corrected in this order, and may correct the speed deviation of the demodulation signal based on the speed calculation value that is calculated. In this case, the RRO learning unit 620 corrects the linearity error by correcting the speed deviation. For example, the speed deviation corresponds to a deformation amount of a Lissajous waveform with respect to a circular Lissajous waveform corresponding to the demodulation signal.

(Adjustment Method of Rotation Correction Value)

The RRO learning unit 620 calculates (adjusts) a rotation correction value corresponding to a demodulation signal, and corrects a rotation deviation corresponding to the demodulation signal based on the rotation correction value that is calculated (adjusted). The RRO learning unit 620 corrects the linearity error by correcting the rotation deviation based on the rotation correction value that is adjusted. For example, the RRO learning unit 620 divides demodulation signals into a plurality of pieces of data (hereinafter, may be referred to as "division data") for every phase (hereinafter, may be referred to as "divided region", or "divided range", or "divided area"), calculates each rotation correction value corresponding to each piece of division data based on the division data, and corrects a rotation deviation corresponding to the demodulation signals based on the each rotation correction value that is calculated. In an example, the RRO learning unit 620 divides a coordinate space in which an axis corresponding to the N burst demodulation signal and an axis corresponding to the Q burst demodulation signal are orthogonal to each other at the origin (hereinafter, may be referred to simply as "coordinate space") into a plurality of regions (hereinafter, may be referred to as "division regions") around the origin for every particular phase (or angle). The RRO learning unit 620 calculates each rotation correction value corresponding to each piece of division data (or division region) based on the number of pieces of division data in each of the division regions (hereinafter, may be referred to as "the number of pieces of division data") corresponding to the N burst demodulation signal and the Q burst demodulation signal of which the initial phase and the demodulation signal offset are corrected in this order, and corrects the rotation deviation corresponding to the N burst demodulation signal and the Q burst demodulation signal based on the rotation correction value that is calculated. It should be noted that, the RRO learning unit 620 may calculate a rotation correction value corresponding to the N burst demodulation signal and the Q burst demodulation signal of which the initial phase, the demodulation signal offset, and the speed deviation are corrected in this order, and may correct the rotation deviation corresponding to the N burst demodulation signal and the Q burst demodulation signal based on the rotation correction value that is calculated.

Figure 10:
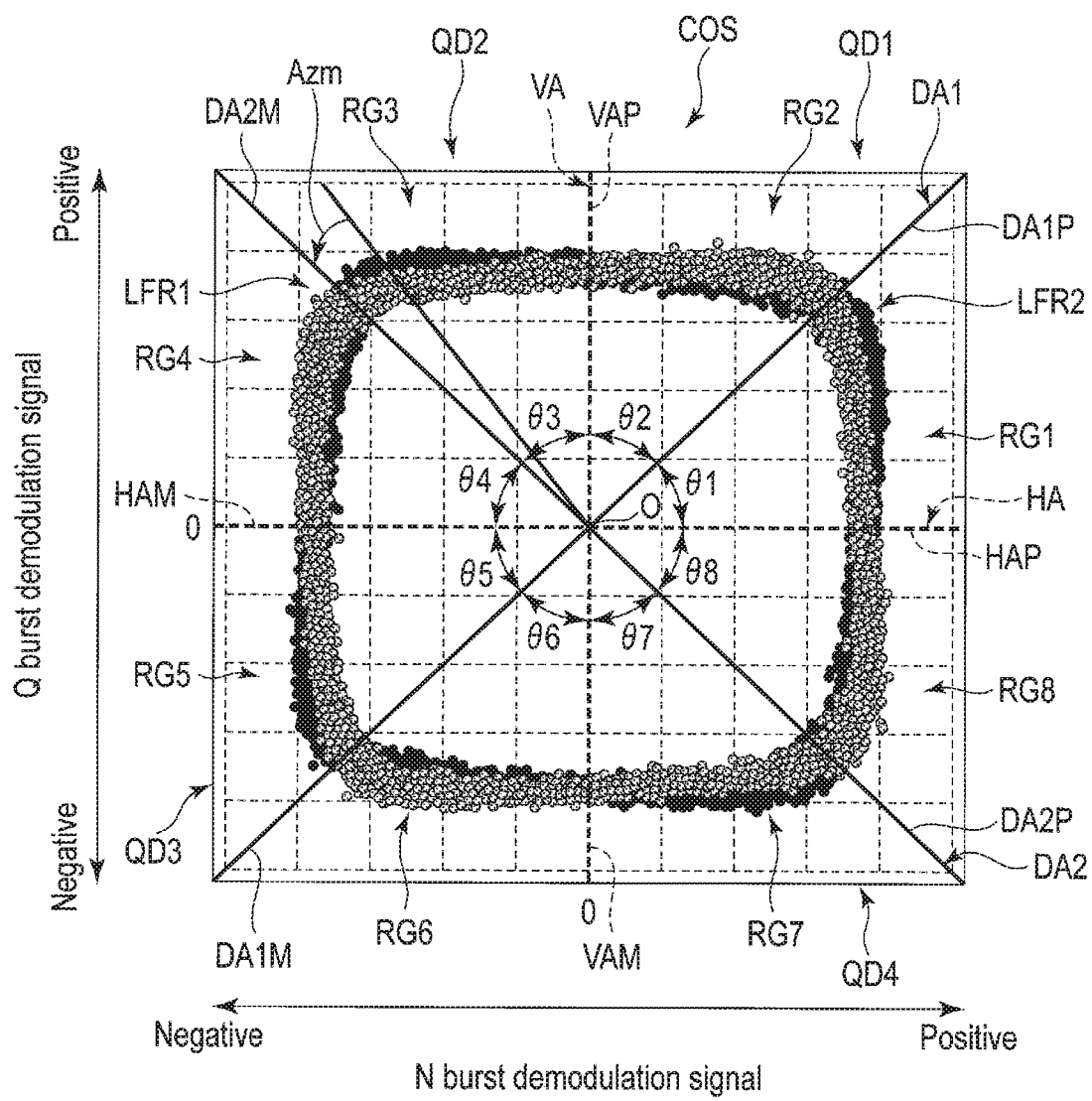
FIG. 10 is a view illustrating an example of a Lissajous waveform in coordinate spaces which are divided.

FIG. 10 is a view illustrating an example of Lissajous waveforms LFR1 and LFR2 in a divided coordinate space. In FIG. 10, the horizontal axis represents the N burst demodulation signal, and the vertical axis represents the Q burst demodulation signal. In the horizontal axis in FIG. 10, the N burst demodulation signal becomes larger in a positive value direction as it goes toward a "positive" arrow direction from the origin O, and becomes smaller in a negative value direction as it goes toward a "negative" arrow direction from the origin O. In FIG. 10, a horizontal axis HA that is parallel to the horizontal axis and passes through the origin O, and a vertical axis VA that is parallel to the vertical axis and passes through the origin O are illustrated. For example, the horizontal axis HA and the vertical axis VA intersect each other at the origin O and are orthogonal to each other. The horizontal axis HA includes a straight line HAP that extends from the origin O on a positive value side, and a straight line HAM that extends from the origin O on a negative value side. The vertical axis VA includes a straight line VAP that extends from the origin O on a positive value side and a straight line VAM that extends from the origin O on a negative value side. In FIG. 10, a region, which is located on a further positive value side in comparison to the straight line HAP in the vertical axis and on a further positive value side in comparison to the straight line VAP in the horizontal axis, is referred to as a first quadrant QD1, a region, which is located on a further positive value side in comparison to the straight line HAM in the vertical axis and on a further negative value side in comparison to the straight line VAP in the horizontal axis, is referred to as a second quadrant QD2, a region, which is located on a further negative value side in comparison to the straight line HAM in the vertical axis and on a further negative value side in comparison to the straight line VAM in the horizontal axis, is referred to as a third quadrant QD3, and a region, which is located on a further negative value side in comparison to the straight line HAP in the vertical axis and on a further positive value side in comparison to the straight line VAM in the horizontal axis, is referred to as a fourth quadrant QD4. It should be noted that, in FIG. 10, an oblique line DA1 that passes through the origin O and extends from the first quadrant QD1 to the third quadrant QD3, and an oblique line DA2 that passes through the origin O and extends from the fourth quadrant QD4 to the second quadrant QD2 are illustrated. The oblique line DA1 and the oblique line DA2 intersect each other at the origin O. In an example, the oblique line DA1 and the oblique line DA2 are orthogonal to each other. It should be noted that, the oblique line DA1 and the oblique line DA2 may not orthogonal to each other. The oblique line DA1 includes a straight line DA1P that extends from the origin O on the first quadrant QD1 side, and a straight line DA1M that extends from the origin O on the third quadrant QD3 side. The oblique line DA2 includes a straight line DA2P that extends from the origin O on the fourth quadrant QD4 side, and a straight line DA2M that extends from the origin O on the second quadrant QD2 side.

In FIG. 10, a region ranging from the straight line HAP to the straight line DA1P is referred to as a "first region RG1", a region ranging from the straight line DA1P to the straight line VAP is referred to as a "second region RG2", a region ranging from the straight line VAP to the straight line DA2M is referred to as a "third region RG3", a region ranging from the straight line DA2M to the straight line HAM is referred to as a "fourth region RG4", a region ranging from the straight line HAM to the straight line DA1M is referred to as a "fifth region RG5", a region ranging from the straight line DA1M to the straight line VAM is referred to as a "sixth region RG6", a region ranging from the straight line VAM to the straight line DA2P is referred to as a "seventh region RG7", and a region ranging from the straight line DA2P to the straight line HAP is referred to as an "eighth region RG8". In the example illustrated in FIG. 10, the first region RG1 to the eighth region RG8 are formed by dividing a coordinate space COS, in which an axis (horizontal axis HA) corresponding to the N burst demodulation signal and an axis (vertical axis VA) corresponding to the Q burst demodulation signal are orthogonal to each other at the origin O, around the origin O at an even angle (or phase). It should be noted that, the first region RG1 to the eighth region RG8 may be formed by dividing the coordinate space COS around the origin O at angles (or phases) different from each other. As in the first region RG1 to the eighth region RG8, regions which are formed by dividing the coordinate space COS may be referred to as division regions. FIG. 10 illustrates an angle θ1 between the straight line HAP and the straight line DA1P, an angle θ2 between the straight line DA1P and the straight line VAP, an angle θ3 between the straight line VAP and the straight line DA2M, an angle θ4 between the straight line DA2M and the straight line HAM, an angle θ5 between the straight line HAM and the straight line DA1M, an angle θ6 between the straight line DA1M and the straight line VAM, an angle θ7 between the straight line VAM and the straight line DA2P, and an angle θ8 between the straight line DA2P and the straight line HAP. In the example illustrated in FIG. 10, the angles θ1 to θ8 are the same as each other. For example, relationships of $0°≤θ1<45°$, $45°≤θ2<90°$, $90°≤θ3<135°$, $135°≤θ4<180°$, $180°≤θ5<225°$, $225°≤θ6<270°$, $270°≤θ7<315°$, and $315°≤θ8<360°$ are established. It should be noted that, the angles θ1 to θ8 may be different from each other. In FIG. 10, a Lissajous waveform LFR1 that is non-symmetric to the horizontal axis HA and is non-symmetric to the vertical axis VA, and a Lissajous waveform LFR2 that is symmetric to the horizontal axis HA and is symmetric to the vertical axis VA are illustrated. One round of the Lissajous waveforms LFR1 and LFR2 corresponds to a plurality of N burst demodulation signals and a plurality of Q burst demodulation signals which respectively correspond to a plurality of positions in a radial region corresponding to two servo tracks. For example, the one round of the Lissajous waveforms LFR1 and LFR2 corresponds to a plurality of N burst demodulation signals and a plurality of Q burst demodulation signals which are respectively read at a plurality of positions in a radial region corresponding to the tracks TRn and TRn+1 illustrated in FIG. 3. In FIG. 10, a plurality of points which form the Lissajous waveform LFR1 correspond to a plurality of N burst demodulation signals and a plurality of Q burst demodulation signals which respectively correspond to a plurality of position in a radial region. In FIG. 10, a plurality of points which form the Lissajous waveform LFR2 correspond to a plurality of N burst demodulation signals and a plurality of Q burst demodulation signals which respectively correspond to a plurality of positions in a radial region. The Lissajous waveform LFR1 deviates from the Lissajous waveform LFR2 by an angle Azm around the origin O in a rotation direction. The angle Azm corresponds to the rotation correction value. In the Lissajous waveform LFR1 illustrated in FIG. 10, the number of pieces of data corresponding to the N burst demodulation signal and the Q burst demodulation signal is different in the first region RG1 to the eighth region RG8. In the Lissajous waveform LFR2 illustrated in FIG. 10, the number of pieces of data corresponding to the N burst demodulation signal and the Q burst demodulation signal is approximately evenly distributed in the first region RG1 to the eighth region RG8.

In the example illustrated in FIG. 10, the RRO learning unit 620 divides the coordinate space COS into the first region RG1 to the eighth region RG8 around the origin O. For example, the RRO learning unit 620 divides the coordinate space COS into the first region RG1 to the eighth region RG8 around the origin O based on the amplitude relationship and sign of the N burst demodulation signal and the Q burst demodulation signal. The RRO learning unit 620 sets a region satisfying relationships of the N burst demodulation signal (NF)≥0, the Q burst demodulation signal (QF) ≥0, and an absolute value of NF≥an absolute value of QF as the first region RG1, sets a region satisfying relationships of NF≥0, QF≥0, and the absolute value of NF<the absolute value of QF as the second region RG2, sets a region satisfying relationships of NF<0, QF≥0, and the absolute value of NF<the absolute value of QF as the third region RG3, and sets a region satisfying relationships of NF<0, QF≥0, and the absolute value of NF≥the absolute value of QF as the fourth region RG4. In addition, the RRO learning unit 620 sets a region satisfying relationships of NF<0, QF<0, and the absolute value of NF≥the absolute value of QF as the fifth region RG5, sets a region satisfying relationships of NF<0, QF≥0, and the absolute value of NF<the absolute value of QF as the sixth region RG6, sets a region satisfying relationships of NF≥0, QF<0, and the absolute value of NF<the absolute value of QF as the seventh region RG7, and sets a region satisfying relationships of NF≥0, QF<0, and the absolute value of NF 2 the absolute value of QF as the eighth region RG8. It should be noted that, the RRO learning unit 620 may divides the coordinate space COS into regions in a number other than eight.

In an example, the RRO learning unit 620 calculates an angle (or a rotation amount), which is rotated around the origin O so that the number of pieces of data corresponding to the N burst demodulation signal and the Q burst demodulation signal becomes approximately the same in each of the first region RG1 to the eighth region RG8, as the rotation correction value Azm. In another example, the RRO learning unit 620 calculates an angle, which is rotated around the origin O so that a difference between a total number of pieces of data in the first region RG1, the third region RG3, the fifth region RG5, and the seventh region RG7 and a total number of pieces of data in the second region RG2, the fourth region RG4, the sixth region RG6, and the eighth region RG8 becomes zero, as the rotation correction value Azm. In still another example, the RRO learning unit 620 calculates an angle, which is rotated around the origin O so that a standard deviation of the number of pieces of data in the first region RG1 to the eighth region RG8 becomes the minimum, as the rotation correction value Azm.

The RRO learning unit 620 corrects an N burst demodulation signal N3 into an N burst demodulation signal N4 based on the rotation correction value Azm, the N burst demodulation signal N3, and the Q burst demodulation signal Q3 by using the following expression.

$$N4=N3\times\cos(Azm)\times Q3\times\sin(Azm) \quad (13)$$

The RRO learning unit 620 corrects the Q burst demodulation signal Q3 into a Q burst demodulation signal Q4 based on the rotation correction value Azm, the N burst demodulation signal N3, and the Q burst demodulation signal Q3 by using the following expression.

$$Q4=N3\times\cos(Azm)+Q3\times\sin(Azm) \quad (14)$$

Figure 11:
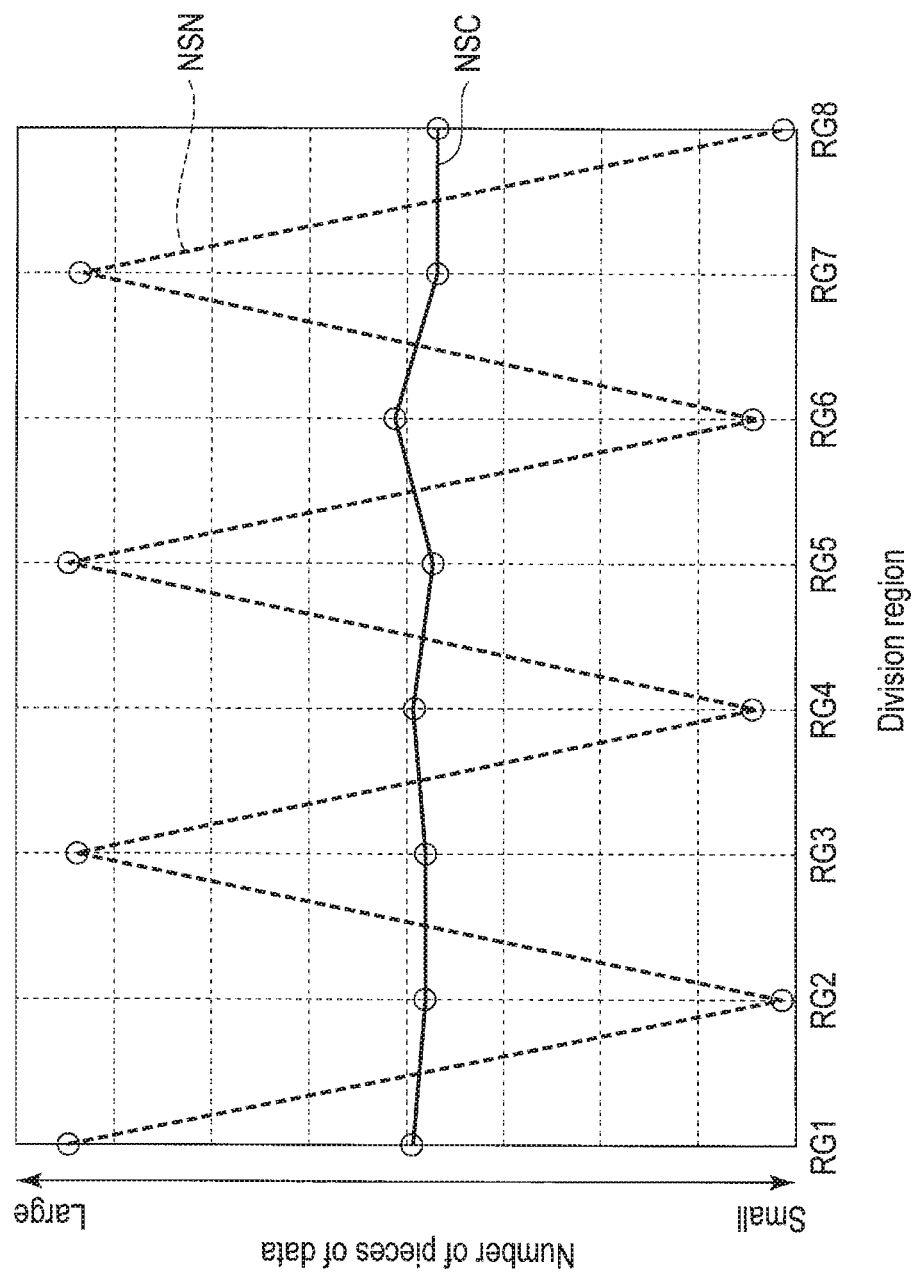
FIG. 11 is a view illustrating an example of a variation of the number of pieces of data which corresponding to a division region.

FIG. 11 is a view illustrating an example of a variation in the number of pieces of data with respect to the division region. FIG. 11 corresponds to the example illustrated in FIG. 10. In FIG. 11, the horizontal axis represents the division region, and the vertical axis represents the number of pieces of data. In the horizontal axis in FIG. 11, the first region RG1 to the eighth region RG8 in FIG. 10 are illustrated. In the vertical axis in FIG. 11 the number of pieces of data becomes larger as it goes toward a "large" arrow direction, and becomes smaller as it goes toward a "small" arrow direction. In FIG. 11, a variation NSN of the number of pieces of data with respect to a division region (hereinafter, may be referred to as "variation of the number of pieces of data") corresponding to the Lissajous waveform LFR1 NSN, and a variation NSC of the number of pieces of data corresponding to the Lissajous waveform LFR2 are illustrated.

The RRO learning unit 620 can correct the variation of the number of pieces of data in the first region RG1 to the eighth region RG8 from an non-uniform state as illustrated in the variation NSN of the number of pieces of data to a uniform state as illustrated in the variation NSC of the number of pieces of data by correcting the Lissajous waveform LFR1 to the Lissajous waveform LFR2 based on the rotation correction value Azm. In this manner, it is possible to improve the linearity error by correcting the rotation deviation based on the rotation correction value Azm.

(Correction Method of Gamma Correction Value)

The RRO learning unit 620 calculates (adjusts) a gamma (γ) correction value corresponding to a demodulation signal, and calculates a demodulation position based on the gamma correction value that is calculated (hereinafter, referred to as "gamma correction"). The RRO learning unit 620 corrects the linearity error by calculating the demodulation position based on the gamma correction value that is adjusted. The RRO learning unit 620 executes the gamma correction in order for the linearity error to decrease (to be a linear servo demodulation position). For example, the RRO learning unit 620 divides demodulation signals into a plurality of division regions for every phase, calculates a gamma correction value corresponding to each of the division regions based on the data that is divided into each of the division regions, and calculates a demodulation position of the division region based on the gamma correction value that is calculated. The RRO learning unit 620 corrects the linearity error corresponding to the division region by calculating the demodulation position based on the gamma correction value corresponding to the division region. In an example, the RRO learning unit 620 divides the coordinate space into a plurality of division regions for every particular phase (or angle) around the origin, for example, into the first region RG1 to the eighth region RG8 illustrated in FIG. 10. The RRO learning unit 620 calculates the gamma correction value for every division region based on division data of each of the division regions corresponding to the N burst demodulation signal and the Q burst demodulation signal of which the initial phase the demodulation signal offset and the rotation deviation are corrected in this order, and calculates each demodulation position corresponding to each piece of division data (or each division region) based on each of the gamma correction values which are calculated. It should be noted that, the RRO learning unit 620 may calculates gamma corresponding to the N burst demodulation signal and the Q burst demodulation signal of which the initial phase, the demodulation signal offset, the speed deviation, and the rotation deviation are corrected in this order, and may calculate the demodulation position based on the correction gamma.

For example, the RRO learning unit 620 calculates a demodulation position d1 corresponding to a plurality of the N burst demodulation signals N4 and a plurality of the Q burst demodulation signal Q4 by using the following expression.

In the case of abs(N4)≥abs(Q4), $$d1=(1-\gamma c)\times(Q4/N4)+\gamma c\times(Q4/N4)^2 \quad (15)$$

In the case of abs(N4)<abs(Q4), $$d1=(1-\gamma c)\times(N4/Q4)+\gamma c\times(N4/Q4)^2 \quad (16)$$

Here, abs(N4) represents an absolute value of the N burst demodulation signal N4, abs(Q4) represents an absolute value of the Q burst demodulation signal Q4, and γc represents a gamma correction value.

The RRO learning unit 620 calculates a plurality of demodulation positions d0 corresponding to the plurality of N burst demodulation signals and the plurality of Q burst demodulation signals by using Expression (15), Expression (16), and γc=0. The RRO learning unit 620 sets the order of a plurality of the demodulation positions d1 corresponding to the plurality of N burst demodulation signals N4 and the plurality of Q burst demodulation signals Q4 based on the plurality of demodulation positions d0 in the order from a small value to a large value (in ascending order). The RRO learning unit 620 classifies the plurality of demodulation positions d1 of which the order is set in ascending order into the first region RG1 to a plurality of division regions, for example, the eighth region RG8 illustrated in FIG. 10. In the example illustrated in FIG. 10, a range of the servo offset amount in the first region RG1 is 0.0 to 0.25 (servo track), a range of the servo offset amount in the second region RG2 is 0.25 to 0.5 (servo track), a range of the servo offset amount in the third region RG3 is 0.5 to 0.75 (servo track), a range of the servo offset amount in the fourth region RG4 is 0.75 to 1.0 (servo track), a range of the servo offset amount in the fifth region RG5 is 1.0 to 1.25 (servo track), a range of the servo offset amount in the sixth region RG6 is 1.25 to 1.5 (servo track), a range of the servo offset amount in the seventh region RG7 is 1.5 to 1.75 (servo track), a range of the servo offset amount in the eighth region RG8 is 1.75 to 2.0 (servo track).

In a case where a total number of pieces of data in the first region RG1 to the eighth region RG8 (hereinafter, referred to as the number of all pieces of data) is Len, a graduation width of a scale X that becomes a reference (hereinafter, referred to as "reference scale") is two servo tracks/Len. For example, the number Len of all pieces of data is the number of servo tracks×the number of servo offsets that is read in each track (hereinafter, may be referred to as "the number of measurement offsets"). The reference scale X is expressed by the following expression. It should be noted that, the reference scale may be the target scale.

$$X=0,2/\text{Len},2\times2/\text{Len},3\times2/\text{Len},\ldots,(\text{Len}-1)\times2/\text{Len} \quad (17)$$

The RRO learning unit 620 calculates a minimum value of a standard deviation a of an error (hereinafter, may be referred to as "evaluation value") between the reference scale X and the demodulation position d1 expressed by Expression (17) as the gamma correction value γc. In other words, the RRO learning unit 620 calculates a minimum value of the evaluation value as the gamma correction value γc. For example, the evaluation value corresponds to the above-described scale error. The RRO learning unit 620 calculates the demodulation position based on the calculated gamma correction value γc, and corrects the linearity. For example, the RRO learning unit 620 calculates the gamma correction value for every division region, calculates a demodulation position corresponding to each division region based on the calculated gamma correction value γc calculated for every division region, and corrects the linearity. It should be noted that, the RRO learning unit 620 may evaluate the linearity error based on the evaluation value. For example, in a case where the evaluation value is large, the RRO learning unit 620 evaluates that the linearity error is also large, and in a case where the evaluation value is small, the RRO learning unit 620 evaluates that the linearity error is also small. In addition, in a case where the linearity error becomes sufficiently small due to adjustment of gamma, the RRO learning unit 620 may not perform table correction to be described later.

FIG. 12 is a view illustrating an example of a variation of the evaluation value with respect to the reference scale. In FIG. 12, the horizontal axis represents the reference scale (servo track), and the vertical axis represents the evaluation value (servo track). In the horizontal axis in FIG. 12, the reference scale becomes larger as it goes toward a "large" arrow direction, and becomes smaller as it goes toward a "small" arrow direction. In the vertical axis in FIG. 12, the evaluation value becomes larger in a positive value direction as it goes toward a "positive" arrow direction from the origin O, and becomes smaller in a negative value direction as it goes toward a "negative" arrow direction from the origin O. In FIG. 12, a variation EGN of the evaluation value with respect to the reference scale in a case where gamma correction is not performed, and a variation EGC of the evaluation value with respect to the reference scale in a case where gamma correction is performed are illustrated.

The RRO learning unit 620 can correct the variation of the evaluation value with respect to the reference scale from a large state as indicated by the variation EGN of the evaluation value with respect to the reference scale to an approximately zero state as indicated by the variation EGC of the evaluation value with respect to the reference scale by performing the gamma correction based on the gamma correction value γc. In this manner, it is possible to improve the linearity error by performing the gamma correction based on the gamma correction value γc.

Figure 13:
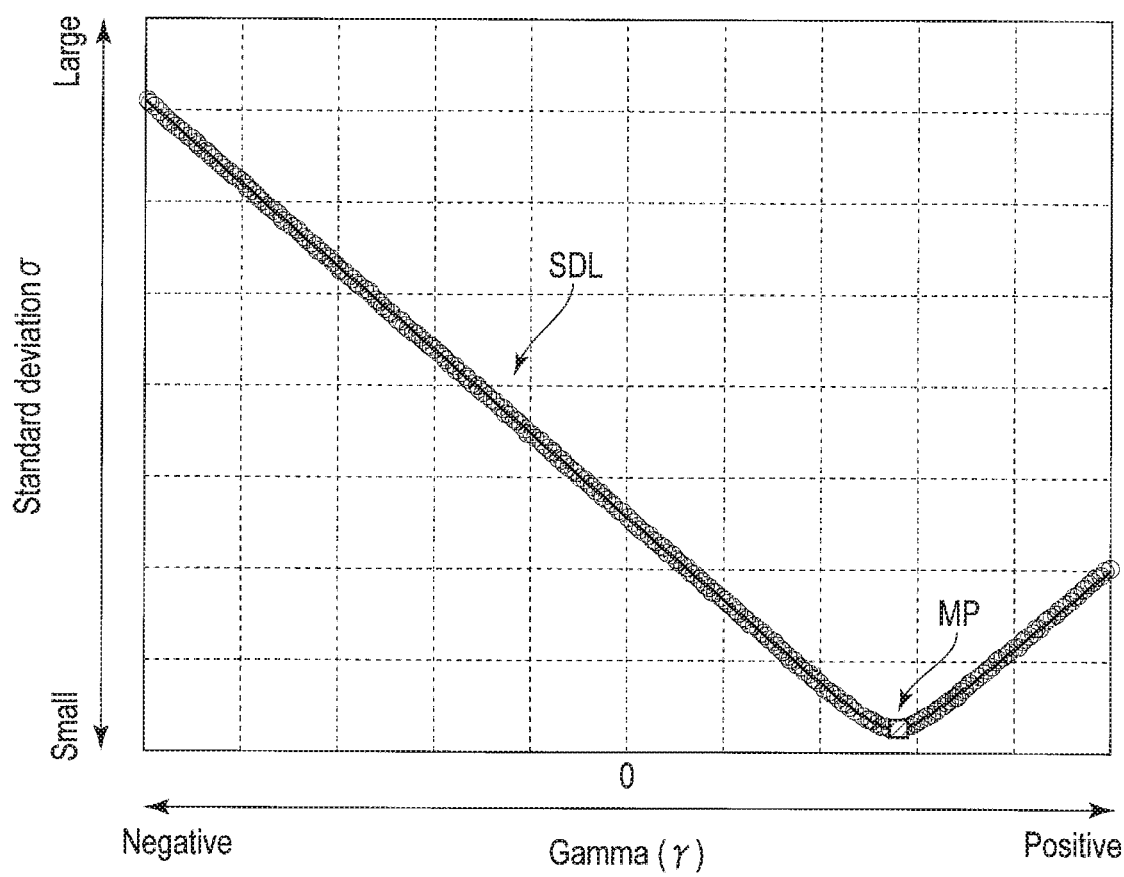
FIG. 13 is a view illustrating an example of a variation of a standard deviation of the evaluation value with respect to gamma.

FIG. 13 is a view illustrating an example of a variation of a standard deviation a of the evaluation value with respect to gamma. In FIG. 13, the horizontal axis represents gamma, and the vertical axis represents the standard deviation a of the evaluation value. In the horizontal axis in FIG. 13, gamma becomes larger in a positive value direction as it goes toward a "positive" arrow direction from the origin O, and becomes smaller in a negative value direction as it goes toward a "negative" arrow direction from the origin O. In the vertical axis in FIG. 13, the standard deviation a of the evaluation value becomes larger as it goes in a "large" arrow direction, and becomes smaller as it goes toward a "small" arrow direction. In FIG. 13, a variation SDL of the standard deviation with respect to gamma, and a minimum value MP of the variation SDL of the standard deviation a of the evaluation value with respect to gamma are illustrated.

The RRO learning unit 620 calculates the variation SDL of the standard deviation a of the evaluation value with respect to gamma, and calculates the minimum value MP of the variation SDL of the standard deviation a of the evaluation value with respect to the calculated gamma as the gamma correction value γc.

Figure 14:
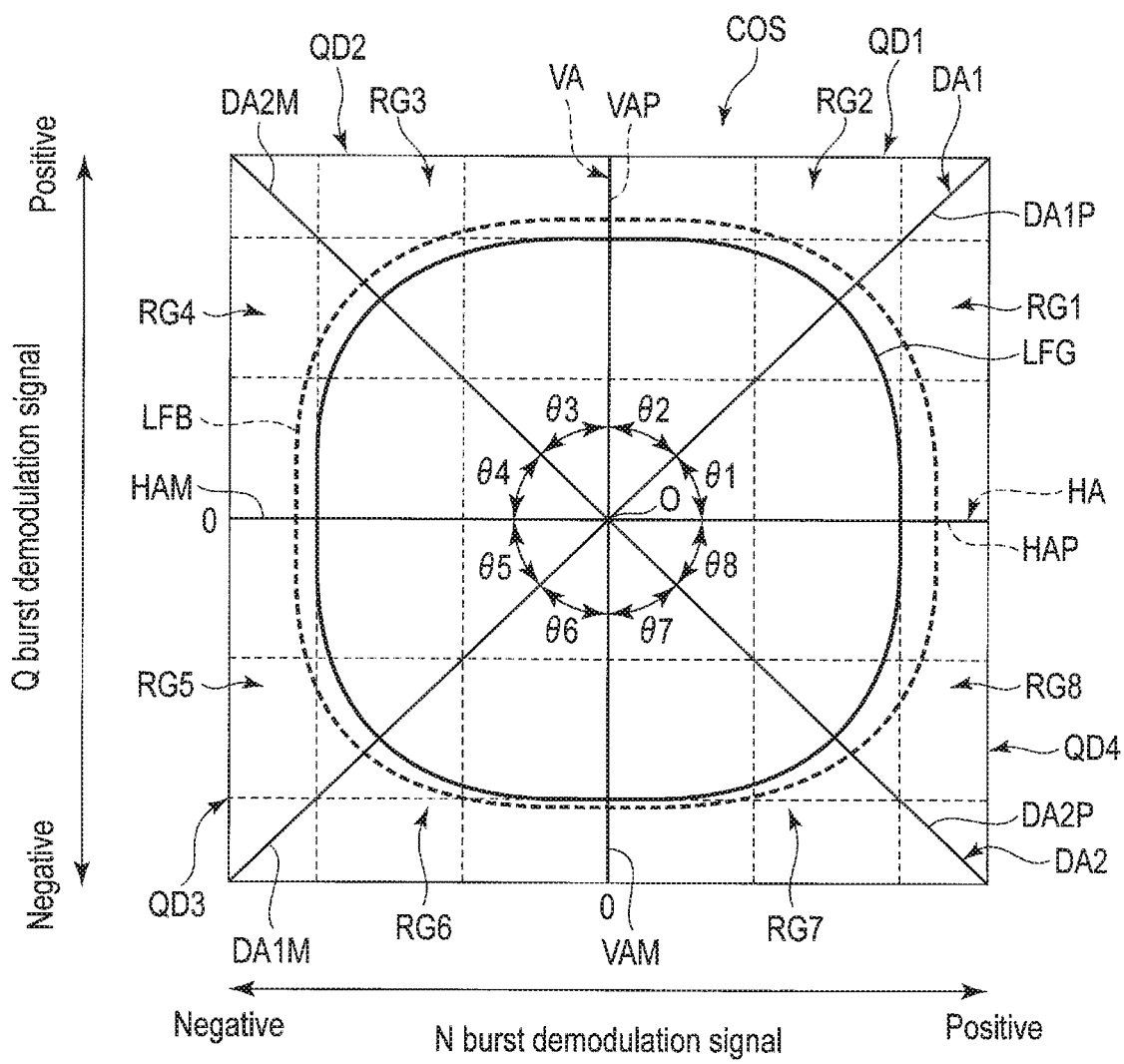
FIG. 14 is a view illustrating an example of a Lissajous waveform with good symmetry and a Lissajous waveform with poor symmetry.

FIG. 14 is a view illustrating an example of a Lissajous waveform LFG with good symmetry and a Lissajous waveform LFB with poor symmetry. In FIG. 14, the horizontal axis represents the N burst demodulation signal, and the vertical axis represents the Q burst demodulation signal. In the horizontal axis in FIG. 14, the N burst demodulation signal becomes larger in a positive value direction as it goes toward a "positive" arrow direction from the origin O, and becomes smaller in a negative value direction as it goes toward a "negative" arrow direction from the origin O. In FIG. 14, the Lissajous waveform LFG with good symmetry and the Lissajous waveform LFB with poor symmetry are illustrated. In the example illustrated in FIG. 14, the Lissajous waveform LFG is symmetric to a horizontal axis HA and is symmetric to a vertical axis VA. The Lissajous waveform LFB is non-symmetric to the horizontal axis HA and is non-symmetric to the vertical axis VA.

In the example illustrated in FIG. 14, the RRO learning unit 620 calculates the gamma correction value γc corresponding to each of division regions of the Lissajous waveform LFG for every division region, and performs gamma correction corresponding to the respective division regions (the region RG1 to the region RG8) of the Lissajous waveform LFG based on the gamma correction value γc that is calculated for every division region. The RRO learning unit 620 calculates the gamma correction value γc corresponding to each of division regions of the Lissajous waveform LFB for every division region, and performs gamma correction corresponding to the respective division regions (the region RG1 to the region RG8) of the Lissajous waveform LFB based on the gamma correction value γc that is calculated for every division region.

Figure 15:
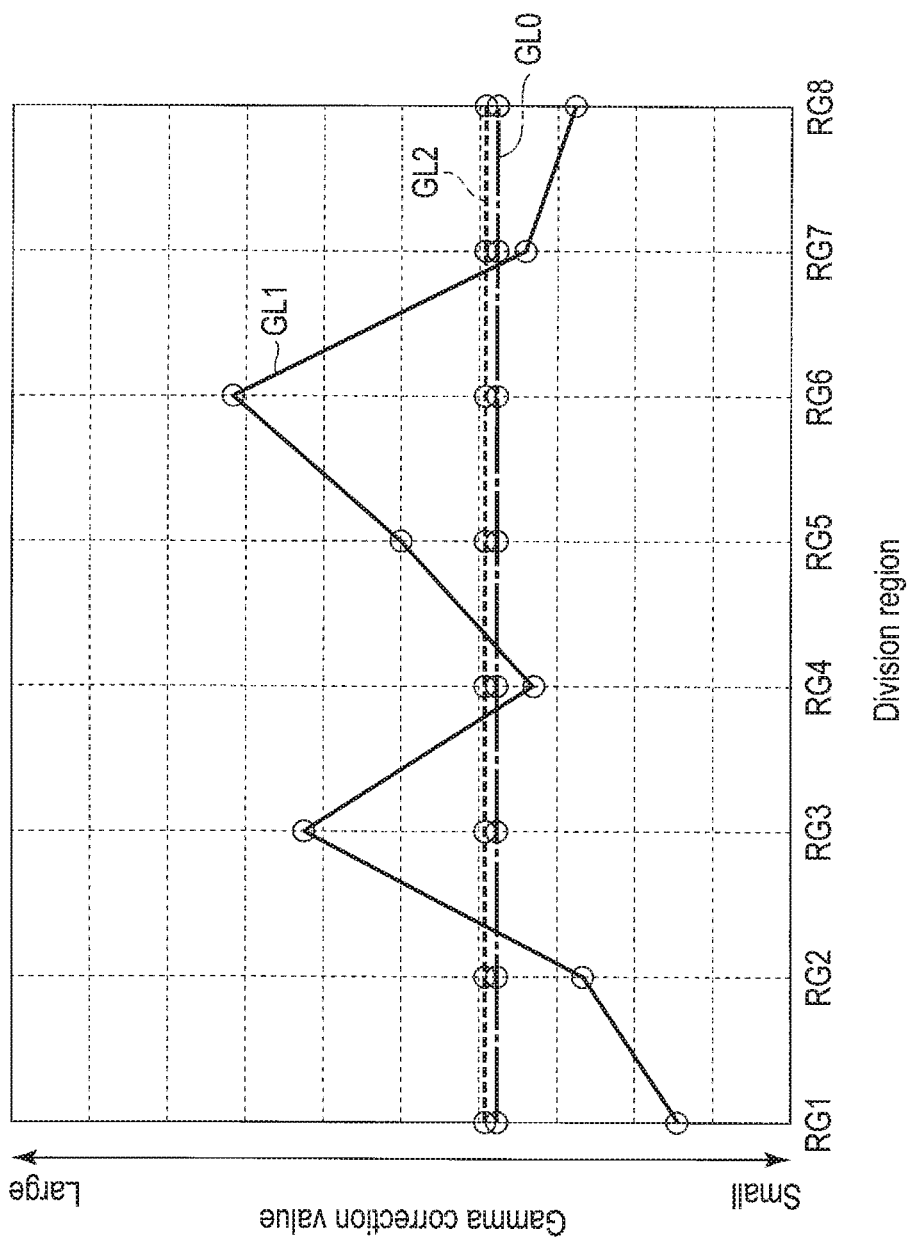
FIG. 15 is a view illustrating an example of a variation of gamma with respect to a division region.

FIG. 15 is a view illustrating an example of a variation of the gamma correction value with respect to the division region. In FIG. 15, the horizontal axis represents the division region, and the vertical axis represents the gamma correction value. In the horizontal axis in FIG. 15, the first region RG1 to the eighth region RG8 in FIG. 10 are illustrated. In the vertical axis in FIG. 15, the gamma correction value becomes larger as it goes toward a "large" arrow direction, and becomes smaller as it goes toward a "small" arrow direction. FIG. 15 illustrates a variation GL0 of the gamma correction value with respect to the division region of the Lissajous waveform LFG with good symmetry in FIG. 14, a variation GL1 of the gamma correction value with respect to the division region in the case of correcting the gamma correction value for every division region of the Lissajous waveform LFB with poor symmetry in FIG. 14, and a variation GL2 of the gamma correction value with respect to the division region in the case of setting the gamma correction value to the same gamma correction value in a total of division regions of the Lissajous waveform LFB with poor symmetry in FIG. 14.

In the example illustrated in FIG. 15, for example, in the case of the Lissajous waveform LFG illustrated in FIG. 14, the RRO learning unit 620 calculates gamma for every division region as indicated by the gamma variation GL0 with respect to the division region. It should be noted that, the RRO learning unit 620 may calculate the gamma correction value corresponding to each piece of division data based on each pieces of division data of each of the division region of the Lissajous waveform LFG, and may perform gamma correction corresponding to each of the division regions of the Lissajous waveform LFG based on each gamma correction value as indicated by the gamma variation GL0 with respect to the division region in FIG. 15.

For example, in the case of the Lissajous waveform LFB illustrated in FIG. 14, the RRO learning unit 620 calculates a gamma correction value for every division region based on the division data of each of the division regions of the Lissajous waveform LFB illustrated in FIG. 14, and performs gamma correction corresponding to each of the division regions of the Lissajous waveform LFB based on each gamma correction value as indicated by the gamma variation GL1 corresponding to the division region in FIG. 15.

For example, in the case of the Lissajous waveform LFB illustrated in FIG. 14, the RRO learning unit 620 calculates a gamma correction value corresponding to a total of division regions based on the division data of the total of division regions of the Lissajous waveform LFB illustrated in FIG. 14, and performs gamma correction corresponding to each of the division regions of the Lissajous waveform LFB based on the gamma correction value corresponding to the total of division regions as indicated by the gamma variation GL2 corresponding to the division region in FIG. 15.

FIG. 16 is a view illustrating an example of a variation of the linearity error with respect to the servo track. In FIG. 16, the horizontal axis represents the servo track, and the vertical axis represents the linearity error (1/servo tract pitch). Here, one servo track pitch corresponds to a distance between track centers of two adjacent tracks in the radial direction. FIG. 16 illustrates a variation GLL0 of the linearity error with respect to the servo track which corresponds to the gamma variation GL0 for every division region in FIG. 15, a variation GLL1 of the linearity error with respect to the servo track which corresponds to the gamma variation GL1 for every division region in FIG. 15, and a variation GLL2 of the linearity error with respect to the servo track which corresponds to the gamma variation GL2 for every division region in FIG. 15. The variation GLL0 of the linearity error with respect to the servo track corresponds to gamma with respect to a division region corresponding to the Lissajous waveform LFG with good symmetry in FIG. 14. The variation GLL1 of the linearity error with respect to the servo track corresponds to gamma for every division region in the case of correcting gamma corresponding to the Lissajous waveform LFB with poor symmetry in FIG. 14 with a gamma correction value calculated for every division region. The variation GLL2 of the linearity error with respect to the servo track corresponds to gamma for every division region in the case of correcting gamma corresponding to the Lissajous waveform LFB with poor symmetry in FIG. 14 with the same gamma correction value in a total of division regions.

In the example illustrated in FIG. 16, the variation GLL2 of the linearity error with respect to the servo track becomes larger in comparison to the variation GLL0 of the linearity error with respect to the servo track corresponding to the Lissajous waveform LFG with good symmetry. In addition, the variation GLL1 of the linearity error with respect to the servo track approaches the variation GLL0 of the linearity error with respect to the servo track. That is, in comparison to the case of correcting gamma corresponding to the Lissajous waveform LFB with poor symmetry with the same gamma correction value in a total of division regions, the variation of the linearity error with respect to the servo track becomes smaller in the case of correcting gamma corresponding to the Lissajous waveform LFB with poor symmetry with the gamma correction value calculated for every division region.

(Adjustment Method of Table Correction Value)

The RRO learning unit 620 calculates (adjusts) a table correction value corresponding to a difference value between the demodulation position calculated based on the gamma correction value and the reference scale, and corrects the demodulation position based on the table correction value that is calculated (adjusted). The RRO learning unit 620 corrects the linearity error by correcting the demodulation position based on the table correction value that is adjusted.

For example, the RRO learning unit 620 calculates a difference value between the reference scale X and the demodulation position d1 calculated based on the gamma correction value as a table correction value CTB by the following expression.

$$CTB(k)=X(k)-d1(k) \quad (18)$$

For example, in the case of dividing two servo tracks into 128 parts, k becomes 0, 1, 2, 3, 4, . . . , 127, and the servo offset amount in the two servo tracks is expressed by k×2/128. It should be noted that, there is a possibility that the table correction value calculated by Expression (18) may include a component corresponding to track pitch unevenness (hereinafter, referred to as "track pitch unevenness component") in the radial position at which servo data is read. In this case, the RRO learning unit 620 may calculate the table correction value by removing an unnecessary component such as the track pitch unevenness component.

FIG. 17 is a view illustrating an example of a linear learning position and a distribution of a positioning error corresponding to the linearity error. In FIG. 17, the horizontal axis represents a radial position with respect to a track center RCG of a track TRk, and the vertical axis represents a servo positioning error (repeatable position error (RPE)) in the case of positioning the head 15 to a particular radial position of the track TRk based on the RRO correction amount acquired by the linear RRO correction process in the track TRk. In the horizontal axis, the head 15 is located on an outer periphery side of the disk 10 as it goes toward an "outward direction" arrow, and is located on an inner periphery side of the disk 10 as it goes toward an "inward direction" arrow. In the vertical axis, a positioning error becomes larger as it goes toward a "large" arrow, and the positioning error becomes smaller as it goes toward a "small" arrow. FIG. 17 illustrates the track center RCG of the track TRk, a linear learning position px11 located on an outward side in comparison to the track center RCG, a linear learning position px21 located on an inward side in comparison to the track center RCG, a linear learning position px12 located on an outward side in comparison to the track center RCG and on an inward side in comparison to the linear learning position px11, and a linear learning position px22 located on an inward side in comparison to the track center RCG and on an outward side in comparison to the linear learning position px21. FIG. 17 illustrates a positioning error distribution D1, a positioning error distribution D2, and a positioning error distribution D3.

In the example illustrated in FIG. 17, the positioning error distribution D1 represents a variation of a positioning error in the case of positioning the head 15 to respective radial positions of the track TRk based on respective RRO correction amounts corresponding to the respective radial positions of the track TRk which are acquired through the linear RRO correction process by using two RRO correction amounts which are respectively learned at the linear learning positions px11 and px21 when the linearity error is small. In the positioning error distribution D1, each round spot represents a measurement value of each positioning error measured by positioning the head 15 to each radial position in the track TRk. In FIG. 17, the positioning error distribution D2 represents a variation of a positioning error in the case of positioning the head 15 to respective radial positions of the track TRk based on respective RRO correction amounts corresponding to the respective radial positions of the track TRk which are acquired through the linear RRO correction process by using two RRO correction amounts which are respectively learned at the linear learning positions px11 and px21 when the linearity error is large. In the positioning error distribution D2, each cross spot represents a measurement value of each positioning error measured by positioning the head 15 to each radial position in the track TRk. In FIG. 17, the positioning error distribution D3 represents a variation of a positioning error in the case of positioning the head 15 to respective radial positions of the track TRk based on respective RRO correction amounts corresponding to the respective radial positions of the track TRk which are acquired through the linear RRO correction process by using two RRO correction amounts which are respectively learned at the linear learning positions px12 and px22 when the linearity error is large. In the positioning error distribution D3, each square spot represents a measurement value of each positioning error measured by positioning the head 15 to each radial position in the track TRk.

In the example illustrated in FIG. 17, in a case where the linearity error is large, the positioning error near the track center becomes smaller at the linear learning positions px12 and px22 in comparison to the linear learning positions px11 and px21. In other words, in a case where the linearity error is large, the positioning error becomes smaller when an interval between two linear learning positions (hereinafter, referred to as "linear learning position interval") is narrow. That is, in a case where linearity error is large, a fluctuation period of the RRO is short, and a fluctuation of the RRO is great. As illustrated in FIG. 17, the linearity error corresponds to the RRO (RRO correction amount). For example, in the case of executing the linear RRO correction process, the RRO learning unit 620 makes the linear learning position interval be small as the linearity error increases. In other words, in the case of executing the linear RRO correction process, the RRO learning unit 620 makes the linear learning position interval be large as the linearity error becomes smaller. In addition, for example, in the case of executing the linear RRO correction process, the RRO learning unit 620 can make the linear learning position interval be the maximum when the linearity error is zero.

The RRO recording unit 630 positions the head 15 to a particular radial position, and writes RRO correction data acquired by the RRO learning on a particular servo region SV. The RRO recording unit 630 writes at least one piece of RRO correction data on each servo region SV. The RRO recording unit 630 can adjust a radial width (hereinafter, referred to as "reproduction width") in which the RRO correction data can be read. For example, the RRO recording unit 630 can increase or decrease the reproduction width depending on an arrangement interval of the RRO correction data, a write condition (for example, a write current or write floating), or the like. In addition, the reproduction width also increases or decreases depending on a design condition such as a width of the write head 15W and a width of the read head 15R. The RRO recording unit 630 writes the RRO correction data so that the central position of the reproduction width of the RRO correction data (hereinafter, referred to simply as "RRO correction data") is disposed in a particular range (hereinafter, referred to as "permission range"), which is set from a track center in the radial direction and in which data write is permitted, in each track.

The position correction unit 640 reads RRO correction data (RRO bit) corresponding to a particular region (hereinafter, referred to as "circumferential region") of a particular track in the circumferential direction, and corrects a head position to approach a particular radial position in the circumferential region, for example, a track center based on an RRO correction amount acquired from the RRO correction data that is read, a learning position at which the RRO correction data is learned, and an off-track amount from the track center in the circumferential region corresponding to the RRO correction data to the head position in the circumferential region corresponding to the RRO correction data. The position correction unit 640 calculates a variation of the RRO correction amount in the radial region based on at least two RRO correction amounts which are respectively learned at least at two linear learning positions, and executes the linear RRO correction process of correcting the head position in the radial region based on the calculated variation of the RRO correction amount in the radial region.

Figure 18:
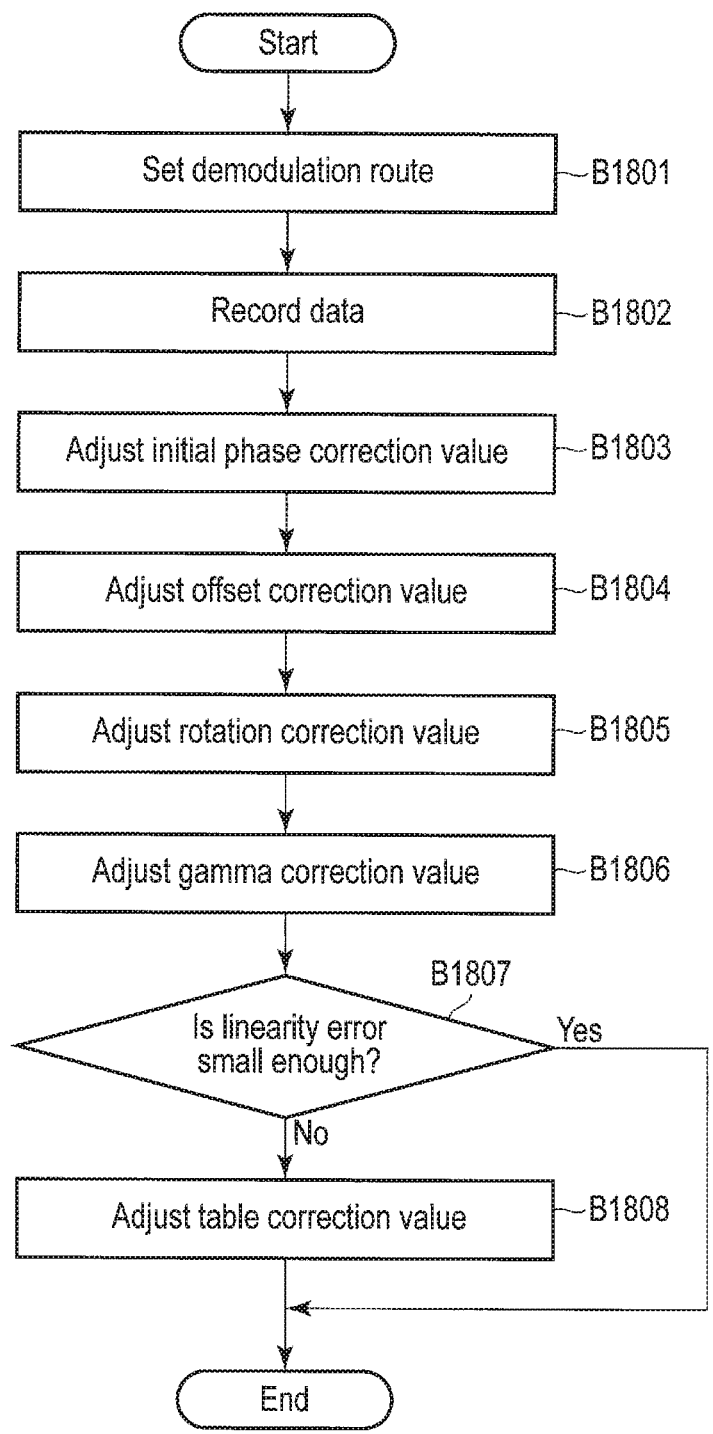
FIG. 18 is a flowchart illustrating an example of an adjustment method of a parameter that is used in correction of the linearity error according to this embodiment.

FIG. 18 is a flowchart illustrating an example of an adjustment method of a correction parameter that is used in correction of the linearity error according to this embodiment.

When calculating the linearity correction parameter, the MPU 60 sets a demodulation route to include a radial range corresponding to the target scale (B1801). For example, the MPU 60 sets a demodulation route for performing reading from a read initiation position to a read termination position that is set to be the same as the read initiation position by crossing a plurality of tracks (two or more servo tracks) and going around the disk 10 by one round. The MPU 60 reads servo data from a servo sector along the demodulation route, and records the read servo data in a particular recording region, for example, the volatile memory 70, the buffer memory 90, or the like (B1802). The MPU 60 adjusts an initial phase correction value corresponding to a demodulation signal demodulated based on the data that is recorded in the particular recording region, and corrects an initial phase of the demodulation signal based on the initial phase correction value that is adjusted (B1803). The MPU 60 adjusts an offset correction value corresponding to the demodulation signal of which the initial phase is corrected, and corrects a demodulation signal offset corresponding to the demodulation signal based on the offset correction value that is adjusted (B1804). The MPU 60 adjusts a rotation correction value corresponding to the demodulation signal of which the initial phase and the demodulation signal offset are corrected in this order, and corrects a rotation deviation corresponding to the demodulation signal based on the rotation correction value that is adjusted (B1805). The MPU 60 adjusts a gamma correction value corresponding to the demodulation signal of which the initial phase, the demodulation signal offset, and the rotation deviation are corrected in this order, and calculates a demodulation position based on the gamma correction value that is adjusted (B1806). For example, the MPU 60 divides a coordinate space into a plurality of pieces of division data for every particular phase around the origin, adjusts a gamma correction value for every division region based on division data of each division region of which the initial phase, the demodulation signal offset, and the rotation deviation are corrected in this order, and executes linearity correction corresponding to the division region based on the gamma correction value that is adjusted. The MPU 60 determines whether the linearity error is small enough or large (B1807). In other words, the MPU 60 determines whether the adjusted gamma correction value is small enough or large. It should be noted that, the MPU 60 may determine that the linearity error is small enough in a case where it is determined that the linearity error is less than a particular threshold value, and determines that the linearity error is large in a case where it is determined that the linearity error is equal or greater than the threshold value. In a case where it is determined that the linearity error is small enough (YES in B1807), the MPU 60 terminates the process. In a case where it is determined that the linearity error is large (NO in B1807), the MPU 60 adjusts a table adjustment value corresponding to a difference value between the demodulation position calculated based on the gamma correction and the reference scale (B1808), corrects a demodulation position based on the adjusted table correction value, and terminates the process.

According to this embodiment, when calculating the correction parameter, the magnetic disk device 1 sets the demodulation route of performing read from the read initiation position to the read termination position that is set to be the same as the read initiation position by crossing a plurality of tracks and going around the disk 10 by one round. The magnetic disk device 1 reads servo data from the servo sector along the demodulation route that is set, calculates (adjusts) the initial phase correction value corresponding to a demodulation signal obtained by demodulating the servo data that is read, and corrects an initial phase of the demodulation signal based on the initial phase correction value that is calculated (adjusted). The magnetic disk device 1 calculates (adjusts) an offset correction value corresponding to the demodulation signal of which the initial phase is corrected, and corrects a demodulation signal offset corresponding to the demodulation signal based on the offset correction value that is calculated (adjusted). The magnetic disk device 1 calculates (adjusts) a rotation correction value corresponding to the demodulation signal of which the initial phase and the demodulation signal offset are corrected, and corrects a rotation deviation corresponding to the demodulation signal based on the rotation correction value that is calculated (adjusted). The magnetic disk device 1 divides the coordinate space into a plurality of division regions for every particular angle around the origin, calculates (adjusts) the gamma correction value for every division region based on the division data of each division region corresponding to the demodulation signal of which the initial phase, the demodulation signal offset, and the rotation deviation are corrected in this order, and calculates each demodulation position based on each correction gamma that is calculated (adjusted). The magnetic disk device 1 calculates (adjusts) the table correction value corresponding to a difference value between the demodulation position calculated through the gamma correction and the reference scale, and corrects the demodulation position based on the table correction value that is calculated (adjusted). The magnetic disk device 1 corrects the linearity error for every division region based on the gamma correction value that is calculated for every division region, and thus it is possible to improve accuracy of the linearity error. The magnetic disk device 1 sets the linear learning position based on gamma that is calculated in the linearity correction. According to this, the magnetic disk device 1 can improve accuracy of the linear RRO correction process. Accordingly, the magnetic disk device 1 can improve the servo positioning accuracy.

Next, a magnetic disk device according to a modification example and another embodiment will be described. In the modification example and the other embodiment, the same reference symbol will be given to a portion that is the same as in the above-described embodiment, and detailed description thereof will be omitted.

Modification Example 1

A magnetic disk device 1 of Modification Example 1 is different from the above-described embodiment in the number of the division regions.

Figure 19:
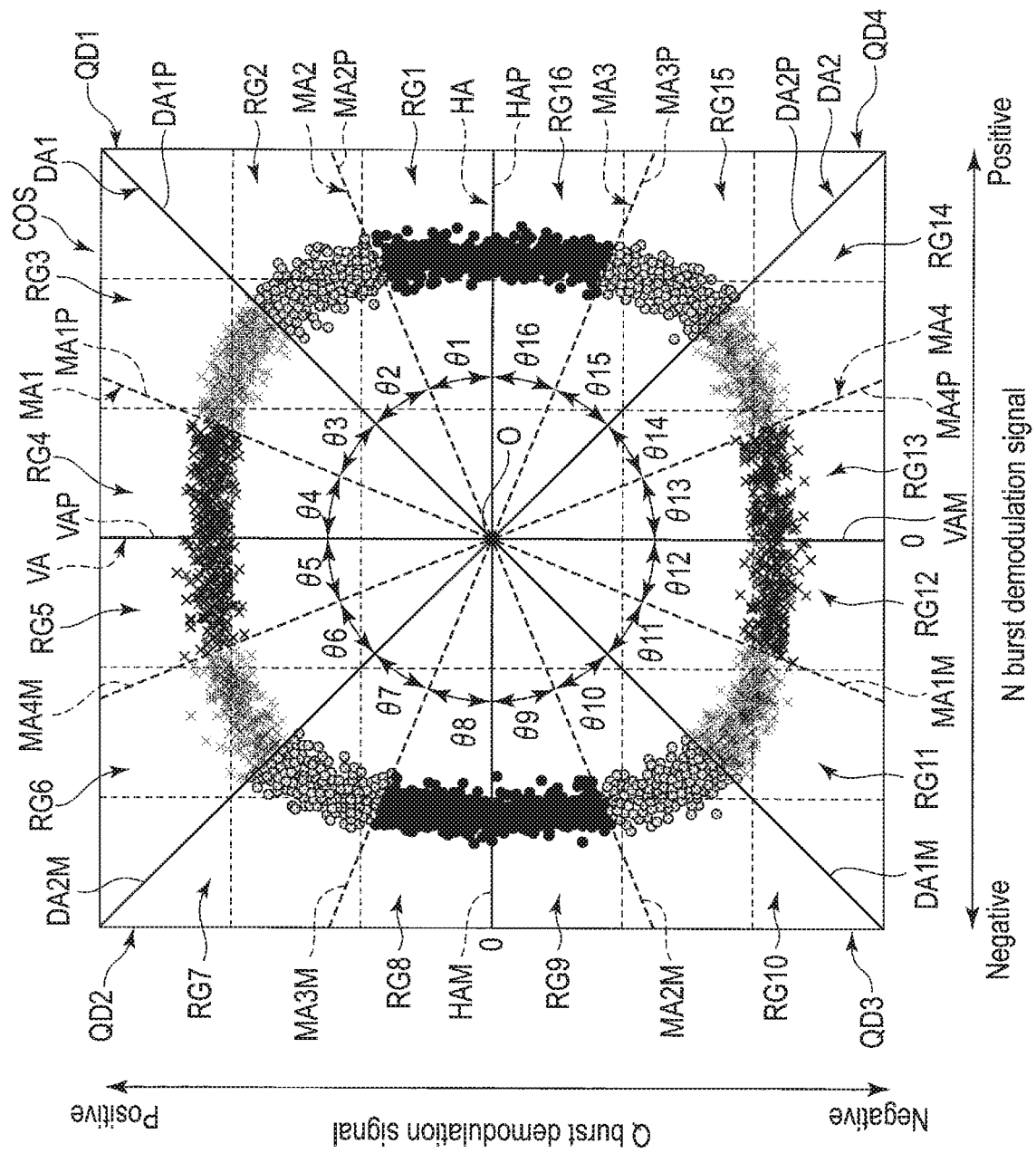
FIG. 19 is a view illustrating an example of a Lissajous waveform in coordinate spaces which are divided.

FIG. 19 is a view illustrating an example of a Lissajous waveform LFR2 in a divided coordinate space. FIG. 19 illustrates an oblique line MA1 that passes through the origin O between the vertical axis VA and the oblique line DA1 and extends from the first quadrant QD1 to the third quadrant QD3, an oblique line MA2 that passes through the origin O between the oblique line DA1 and the horizontal axis HA and extends from the first quadrant QD1 to the third quadrant QD3, an oblique line MA3 that passes through the origin O between the horizontal axis HA and the oblique line DA2, and extends from the fourth quadrant QD4 to the second quadrant QD2, and an oblique line MA4 that passes through the origin O between the vertical axis VA and the oblique line DA2, and extends from the fourth quadrant QD4 to the second quadrant QD2. The oblique lines MA1, MA2, MA3, and MA4 intersect each other at the origin O. In an example, the oblique lines MA1 and MA3 are orthogonal to each other. In addition, the oblique lines MA2 and MA4 are orthogonal to each other. It should be noted that, the oblique lines MA1 and MA3 may not be orthogonal to each other, and the oblique lines MA2 and MA4 may not be orthogonal to each other. The oblique line MA1 includes a straight line MA1P that extends from the origin O on the first quadrant QD1 side, and a straight line MA1M that extends from the origin O on the third quadrant QD3 side. The oblique line MA2 includes a straight line MA2P that extends from the origin O on the first quadrant QD1 side, and a straight line MA2M that extends from the origin O on the third quadrant QD3 side. The oblique line MA3 includes a straight line MA3P that extends from the origin O on the fourth quadrant QD4 side, and a straight line MA3M that extends from the origin O on the second quadrant QD2 side. The oblique line MA4 includes a straight line MA4P that extends from the origin O on the fourth quadrant QD4 side, and a straight line MA4M that extends from the origin O on the second quadrant QD2 side.

In FIG. 19, a region ranging from the straight line HAP to the straight line MA2P is referred to as "first region RG1", a region ranging from the straight line MA2P to the straight line DA1P is referred to as "second region RG2", a region ranging from the straight line DA1P to the straight line MA1P is referred to as "third region RG3", a region ranging from the straight line MA1P to the straight line VAP is referred to as "fourth region RG4", a region ranging from the straight line VAP to the straight line MA4M is referred to as "fifth region RG5", a region ranging from the straight line MA4M to the straight line DA2M is referred to as "sixth region RG6", a region ranging from the straight line DA2M to the straight line MA3M is referred to as "seventh region RG7", a region ranging from the straight line MA3M to the straight line HAM is referred to as "eighth region RG8", a region ranging from the straight line HAM to the straight line MA2M is referred to as "ninth region RG9", a region ranging from the straight line MA2M to the straight line DA1M is referred to as "tenth region RG10", a region ranging from the straight line DA1M to the straight line MA1M is referred to as "eleventh region RG11", a region ranging from the straight line MA1M to the straight line VAM is referred to as "twelfth region RG12", a region ranging from the straight line VAM to the straight line MA4P is referred to as "thirteenth region RG13", a region ranging from the straight line MA4P to the straight line DA2P is referred to as "fourteenth region RG14", a region ranging from the straight line DA2P to the straight line MA3P is referred to as "fifteenth region RG15", and a region ranging from the straight line MA3P to the straight line HAP is referred to as "sixteenth region RG16".

In the example illustrated in FIG. 19, the first region RG1 to the sixteenth region RG16 are formed by dividing the coordinate space COS, in which an axis (horizontal axis HA) corresponding to the N burst demodulation signal and an axis (vertical axis VA) corresponding to the Q burst demodulation signal are orthogonal to each other at the origin O, around the origin Q at an even angle (or phase). It should be noted that, the first region RG1 to the sixteenth region RG16 may be formed by dividing the coordinate space COS around the origin O at angles (or phases) different from each other. FIG. 19 illustrates an angle θ1 between the straight line HAP and the straight line MA2P, an angle θ2 between the straight line MA2P and the straight line DA1P, an angle θ3 between the straight line DA1P and the straight line MA1P, an angle θ4 between the straight line MA1P and the straight line VAP, an angle θ5 between the straight line VAP and the straight line MA4M, an angle θ6 between the straight line MA4M and the straight line DA2M, an angle θ7 between the straight line DA2M and the straight line MA3M, and an angle θ8 between the straight line MA3M and the straight line HAM. In addition, FIG. 19 illustrates an angle θ9 between the straight line HAM and the straight line MA2M, an angle θ10 between the straight line MA2M and the straight line DA1M, an angle θ11 between the straight line DA1M and the straight line MA1M, an angle θ12 between the straight line MA1M and the straight line VAM, an angle θ13 between the straight line VAM and the straight line MA4P, an angle θ14 between the straight line MA4P and the straight line DA2P, an angle θ15 between the straight line DA2P and the straight line MA3P, and an angle θ16 between the straight line MA3P and the straight line HAP. In the example illustrated in FIG. 19, the angles θ1 to 816 are the same as each other. For example, relationships of 0°≤θ1<22.5°, 22.5°≤θ2<45°, 45°≤θ3<67.5°, 67.5°≤θ4<90°, 90°≤θ5<112.5°, 112.5°≤θ6<135°, 135°≤θ7<157.5°, 157.5°≤θ8<180°, 180°≤θ9<202.5°, 202.5°≤θ10<225°, 225°≤θ11<247.5°, 247.5°≤θ12<270°, 270°≤θ13<292.5°, 292.5°≤θ14<315°, 315°≤θ15<337.5°, and 337.5°≤θ16<360° are established. It should be noted that, the angles θ1 to θ16 may be different from each other.

In the example illustrated in FIG. 19, the RRO learning unit 620 divides the coordinate space COS into the first region RG1 to the sixteenth region RG16 around the origin O. For example, the RRO learning unit 620 divides the coordinate space COS into the first region RG1 to the sixteenth region RG16 around the origin O based on the amplitude relationship and sign of the N burst demodulation signal and the Q burst demodulation signal. The RRO learning unit 620 sets a region satisfying relationships of the N burst demodulation signal (NF)≥0, the Q burst demodulation signal (QF)≥0, an absolute value of NF≥an absolute value of QF, and an absolute value of NS(=NF^2−QF^2)≥an absolute value of QS(=2NF×NQ) as the first region RG1, sets a region satisfying relationships of NF≥0, QF≥0, the absolute value of NF≥the absolute value of QF, and the absolute value of NS<the absolute value of QS as the second region RG2, sets a region satisfying relationships of NF≥0, QF≥0, the absolute value of NF<the absolute value of QF, and the absolute value of NS<the absolute value of QS as the third region RG3, sets a region satisfying relationships of NF≥0, QF≥0, the absolute value of NF<the absolute value of QF, and the absolute value of NS≥the absolute value of QS as the fourth region RG4. The RRO learning unit 620 sets a region satisfying relationships of NF<0, QF≥0, the absolute value of NF<the absolute value of QF, and the absolute value of NS z the absolute value of QS as the fifth region RG5, sets a region satisfying relationships of NF<0, QF≥0, the absolute value of NF<the absolute value of QF, and the absolute value of NS<the absolute value of QS as the sixth region RG6, sets a region satisfying relationships of NF<0, QF≥0, the absolute value of NF≥the absolute value of QF, and the absolute value of NS<the absolute value of QS as the seventh region RG7, sets a region satisfying relationships of NF<0, QF≥0, the absolute value of NF≥the absolute value of QF, and the absolute value of NS≥the absolute value of QS as the eighth region RG8. The RRO learning unit 620 sets a region satisfying relationships of NF<0, QF<0, the absolute value of NF the absolute value of QF, and the absolute value of NS≥the absolute value of QS as the ninth region RG9, sets a region satisfying relationships of NF<0, QF<0, the absolute value of NF 2 the absolute value of QF, and the absolute value of NS<the absolute value of QS as the tenth region RG10, sets a region satisfying relationships of NF<0, QF<0, the absolute value of NF<the absolute value of QF, and the absolute value of NS<the absolute value of QS as the eleventh region RG11, and sets a region satisfying relationships of NF<0, QF<0, the absolute value of NF<the absolute value of QF, and the absolute value of NS≥the absolute value of QS as the twelfth region RG12. The RRO learning unit 620 sets a region satisfying relationships of NF z 0, QF<0, the absolute value of NF<the absolute value of QF, and the absolute value of NS≥the absolute value of QS as the thirteenth region RG13, sets a region satisfying relationships of NF≥0, QF<0, the absolute value of NF<the absolute value of QF, and the absolute value of NS<the absolute value of QS as the fourteenth region RG14, sets a region satisfying relationships of NF≥0, QF<0, the absolute value of NF≥the absolute value of QF, and the absolute value of NS<the absolute value of QS as the fifteenth region RG15, and sets a region satisfying relationships of NF≥0, QF<0, the absolute value of NF 2 the absolute value of QF, and the absolute value of NS≥the absolute value of QS as the sixteenth region RG16. It should be noted that, the RRO learning unit 620 may divides the coordinate space COS into regions in a number other than sixteen.

In an example, the RRO learning unit 620 divides the coordinate space into a plurality of division region for every particular angle around the origin, for example, the first region RG1 to the sixteenth region RG16 illustrated in FIG. 19. The RRO learning unit 620 calculates the gamma correction value for every division region based on gamma corresponding to the N burst demodulation signal and the Q burst demodulation signal of which the initial phase, the demodulation signal offset, and the rotation deviation are corrected in this order, performs the linearity correction for every division region, and calculates the demodulation position.

According to Modification Example 1, the magnetic disk device 1 divides the coordinate space into the first region RG1 to the sixteenth region RG16 for every particular angle around the origin. The magnetic disk device 1 calculates the gamma correction value for every division region based on division data of each division region corresponding to the N burst demodulation signal and the Q burst demodulation signal of which the initial phase, the demodulation signal offset, and the rotation deviation are corrected in this order, performs the linearity correction for every division region, and calculates the demodulation position. According to this, the magnetic disk device 1 can improve servo positioning accuracy.

Second Embodiment

A magnetic disk device 1 according to a second embodiment is different from the first embodiment and the Modification Example 1 in the configuration of the head 15.

FIG. 20 is a block diagram illustrating the configuration of the magnetic disk device 1 according to the second embodiment.

The head 15 includes a write head 15W and read heads 15R1 and 15R2 which are embedded in a slider. For example, the read head 15R1 is provided at a position that is farthest from the write head 15W. For example, the read head 15R2 is provided at a position farthest from the write head 15W next to the read head 15R1. It should be noted that, three or more read heads may be provided. Hereinafter, for convenience of explanation, data written on a track of the disk 10 may be referred to simply as "track". Hereinafter, description will be made on the assumption that the magnetic disk device 1 positions the head 15 to a particular radial position or a particular track of the disk 10 with the read head 15R1 set as a reference. It should be noted that, the magnetic disk device 1 may position the head 15 with a read head other than the read head 15R1, for example, the read head 15R2 set as a reference.

FIG. 21 is a view illustrating an example of a geometric arrangement of the write head 15W and the two read heads 15R1 and 15R2 when the read head 15R1 is located at the reference position RP0 illustrated in FIG. 2. Hereinafter, description will be given of the geometric arrangement of the write head 15W and the two read heads 15R1 and 15R2 in the head 15 with the position of the read head 15R1 set as a reference. A central portion WC of the write head 15W, and a central portion RC1 of the read head 15R1, and a central portion RC2 of the read head 15R2 are illustrated in FIG. 21. An intermediate portion HR between the central portion RC1 of the read head 15R1 and the central portion RC2 of the read head 15R2 is illustrated in FIG. 21. Hereinafter, a distance between the central portion RC1 of the read head 15R1 and the central portion RC2 of the read head 15R2 in a circumferential direction is referred to as "down track separation (DTS)".

In the example illustrated in FIG. 21, in a case where the read head 15R1 is located at the reference position RP0, the write head 15W is located at a position spaced apart from the read head 15R1 in an outward direction by read/write (R/W) offset OF0. Hereinafter, the R/W offset OF0 is referred to as "reference offset OF0". In addition, the central portion WC of the write head 15W is located at a position spaced apart from the central portion RC1 of the read head 15R1 in a circumferential direction by a read/write (R/W) gap GP0. The reference offset OF0 may occur due to a tolerance during a manufacturing process. It should be noted that, the reference offset OF0 may be zero or a value that is offset in an inward direction. For example, the reference offset OF0 is an order of several hundreds of nanometers [nm]. In addition, the R/W gap GP0 is referred to as "reference gap GP0". For example, the reference gap GP0 is an order of several thousands of nanometers [nm].

In the example illustrated in FIG. 21, in a case where the central portion RC1 of the read head 15R1 is located at the reference position RP0, the central portion RC2 of the read head 15R2 is also located at the reference position RP0. In other words, in a case where the central portion RC1 of the read head 15R1 is located at the reference position RP0, the central portion RC1 of the read head 15R1 and the central portion RC2 of the read head 15R2 are lined up along the circumferential direction. The central portion RC1 of the read head 15R1 is spaced apart from the central portion WC of the write head 15W in the radial direction by the reference offset OF0. The central portion RC2 of the read head 15R2 is spaced apart from the central portion WC of the write head 15W in the radial direction by the reference offset OF0. The central portion RC2 of the read head 15R2 is spaced apart from the central portion RC1 of the read head 15R1 in the circumferential direction by a down track distance DTS0. Hereinafter, the down track distance DTS0 is referred to as "reference down track distance DTS0". For example, the reference down track distance DTS0 is an order of several tens of nanometers [nm]. In a case where the central portion RC1 of the read head 15R1 is located at the reference position RP0, the intermediate portion HR is also located at the reference position RP0. According to this, with regard to the intermediate portion HR, the central portion WC of the write head 15W is spaced apart from the intermediate portion HR by the reference offset OF0. It should be noted that, in a case where the central portion RC1 of the read head 15R1 is located at the radial position RP0, the central portion RC1 of the read head 15R1 and the central portion RC2 of the read head 15R2 may slightly deviate from each other in the radial direction. Hereinafter, for convenience of explanation, "central portion of a read head (write head)" may be noted simply as "read head (write head)".

FIG. 22 is a view illustrating an example of a geometric arrangement of the write head 15W and the two read heads 15R1 and 15R2 in a case where the read head 15R1 is located at the radial position ORP illustrated in FIG. 2. Hereinafter, a distance between the central portion RC1 of the read head 15R1 and the central portion RC2 of the read head 15R2 in the radial direction is referred to as "cross track separation (CTS)".

In the example illustrated in FIG. 22, in a case where the read head 15R1 is located at the radial position ORP, the read head 15R2 is inclined outwardly with respect to the read head 15R1 by a skew angle α. According to this, the read head 15R2 is spaced apart from the read head 15R1 in the radial direction by the cross track distance CTS, and is spaced apart from the read head 15R1 in the circumferential direction by the down track distance DTS. The cross track distance CTS varies in accordance with the skew angle α. The read head 15R1 is spaced apart from the write head 15W in the radial direction by an R/W offset OF1, and is spaced apart from the write head 15W in the circumferential direction by an R/W gap GP1. In addition, in a case where the read head 15R1 is located at the radial position ORP, the intermediate portion HR is spaced apart from the read head 15R1 in the radial direction by the half of the cross track distance CTS, and is spaced apart from the read head 15R1 in the circumferential direction by the half of the down track distance DTS.

It should be noted that, even in a case where the read head 15R1 is located at the radial position IRP, as in a case where the read head 15R1 is located at the radial position ORP, the geometric arrangement of the write head 15W and the two read heads 15R1 and 15R2 can be explained by using the skew angle α, the cross track distance CTS, the reference down track distance DTS0, the reference gap GP0, and the reference offset OF0.

FIG. 23 is a block diagram illustrating a configuration example of an R/W channel 40 and an MPU 60 according to this embodiment. In FIG. 23, the disk 10, the head 15, the driver IC 20, the head amplifier IC 30, and the like omitted.

The R/W channel 40 includes a first demodulation unit 410 and a second demodulation unit 420. For example, the first demodulation unit 410 demodulates data read by the read head 15R1, for example, a servo signal, and outputs the demodulated servo data to the MPU 60 or the like. As in the first demodulation unit 410, the second demodulation unit 420 demodulates a servo signal read by the read head 15R2, and outputs the demodulated servo data to the MPU 60 or the like. It should be noted that, in a case where three or more read heads are provided, the R/W channel 40 may be provided with three or more demodulation units which respectively correspond to the read heads.

A read/write controller 610 executes a read/and write process by using at least one between the read head 15R1 and the read head 15R2. The read/write controller 610 positions the head 15 to a particular radial position of the disk 10, and can execute the read/write process simultaneously with the read head 15R1 and the read head 15R2. Since lateral deviations CTS are different from each other at a radial position at which the head 15 is positioned, the read/write controller 610 can control whether to execute the read/write process by any one between the read head 15R1 and the read head 15R2 or whether to execute the read/write process by both the read head 15R1 and the read head 15R2 in correspondence with the cross track distance CTS. It should be noted that, the read/write controller 610 may record the cross track distance CTS, the reference down track distance DTS0, the reference offset OF0, the reference gap GP0, and the like at each radial position of the disk 10 in a nonvolatile memory 80, a system area 10b, or the like in correlation with the head 15.

An RRO learning unit 620 can execute RRO learning simultaneously by a plurality of the heads 15 (read heads). For example, the RRO learning unit 620 executes the RRO learning simultaneously by the read heads 15R1 and 15R2 in a linear correction region.

In addition, the RRO learning unit 620 calculates demodulation parameters corresponding to a demodulation signal (hereinafter, referred to as "first read signal") obtained by reading servo data with the read head 15R1 and demodulating the servo data and a demodulation signal (hereinafter, referred to as "second read signal") obtained by reading servo data with the read head 15R2 and demodulating the servo data, and calculates a correction parameter based on the first read signal or the second read signal. The RRO learning unit 620 corrects the linearity error by correcting the servo demodulation data read with the read heads 15R1 and 15R2 based on the correction parameter, and calculates a demodulation position.

For example, the RRO learning unit 620 calculates the demodulation position based on demodulation signals obtained by reading both the N burst and the Q burst in the intermediate peripheral region MR at which the cross track distance becomes approximately zero and by performing demodulation. On the other hand, the RRO learning unit 620 can calculate the demodulation position based on a plurality of demodulation signals (N burst demodulation signals) obtained by demodulating N burst signals which are read from the N burst with the read heads 15R1 and 15R2 in an inner peripheral region IR or an outer peripheral region OR in which an absolute value of the cross track distance becomes larger than zero. In other words, in the intermediate peripheral region MR, it is necessary to read both the N burst and the Q burst to calculate the demodulation position, but only the N burst may be read to calculate the demodulation position in the inner peripheral region IR and the outer peripheral region OR. In this case, in the inner peripheral region IR and the outer peripheral region OR, the disk 10 may not include a part or the entirety of the Q burst illustrated in FIG. 3. In the case of calculating the demodulation position based on the plurality of demodulation signals obtained by reading servo data with the read head 15R1 and the read head 15R2 and by demodulating the servo data, a phase difference θr corresponding to delay or advance of a second read signal with respect to a first read signal may be expressed from a cross track distance Tr (=CTS) of two read heads, and a repetitive length L of a burst pattern by the following expression. The repetitive length L of the burst pattern is approximately equal to two times a track pitch.

$$\theta r = 2\pi \times Tr/L \quad (19)$$

Here, a demodulation signal obtained by demodulating N burst data read from the N burst with the read head 15R1 is set as a demodulation signal Nr1, a demodulation signal obtained by demodulating Q burst data read from the Q burst with the read head 15R1 is set as a demodulation signal Qr1, a demodulation signal obtained by demodulating N burst data read from the N burst with the read head 15R2 is set as a demodulation signal Nr2, and a demodulation signal obtained by demodulating Q burst data read from the Q burst with the read head 15R2 is set as a demodulation signal Qr2. For example, the demodulation signal Nr1 becomes a waveform in which a phase is advanced with respect to the demodulation signal Qr1 by 90°. For example, the demodulation signal Nr2 becomes a waveform in which a phase is advanced with respect to the demodulation signal Qr2 by 90°. As expressed by Expression (19), in the case of Tr=L/4 (>0), θr=π/2=90° (phase advancing), and thus Nr2 may be regarded to be the same as Qr1. That is, in the inner peripheral region IR or the outer peripheral region OR in which the absolute value of the cross track distance Tr is greater than 0, a demodulation signal obtained by demodulating N burst data read from the N burst is regarded to the same as the demodulation signal Nr1, and a demodulation signal obtained by demodulating Q burst data read from the Q burst is regarded to be the same as the demodulation signal Nr2, and thus it is possible to calculate a demodulation position without reading the Q burst.

In the case of reading servo data in the inner peripheral region IR and the outer peripheral region OR, the RRO learning unit 620 calculates the demodulation position based on the cross track distance Tr, a first read signal RS1, and a second read signal RS2. In the inner peripheral region IR and the outer peripheral region OR, in the head 15, the skew angle α with respect to a travel direction becomes an angle other than 0°, and thus the demodulation signals Nr1 and Nr2 are output with particular advance or delay. A plurality of demodulation signals (the N burst demodulation signal and the Q burst demodulation signal) obtained by demodulating a plurality of pieces of burst data (the N burst data and the Q burst data) which are respectively read from the N burst and the Q burst with the read head 15R1 are expressed by the following expression.

$$Nr1 = \cos\theta, Qr1 = \sin\theta \quad (20)$$

Here, θ represents a phase angle. On the other hand, when focusing to a relationship between Nr1 and Nr2, in the intermediate peripheral region MR, burst signal amplitude is obtained with the read heads 15R1 and 15R2 located at approximately the same radial position, and thus approximate overlapping occurs. However, in the outer peripheral region OR, a phase advancing relationship in which the demodulation signal Nr1 precedes the demodulation signal Nr2 is established. Conversely, in the inner peripheral region IR, a phase delay relationship in which the demodulation signal Nr1 is delayed from the demodulation signal Nr2 is established. When the phase difference is set as θr, the demodulation signals Nr1 and Nr2 are expressed by the following expression in which advancing occurs on a positive side and delaying occurs on a negative side.

$$Nr1 = \cos\theta, Nr2 = \cos(\theta + \theta r) \quad (21)$$

The reason for this is as follows. Since demodulation positions of a burst pattern in the radial direction become different from each other due to the cross track distance Tr, the phase difference θr is determined in Expression (19) by using the repetitive length L of the burst pattern in the radial direction. When a demodulation signal corresponding to the demodulation signal Qr1 is set as a correction demodulation signal SQ, the following expression is derived from the demodulation signal Nr1, the demodulation signal Nr2, cos θr, and sin θr.

$$SQ = \sin\theta = (Nr1 \times \cos\theta r - Nr2)/\sin\theta r \quad (22)$$

In the case of calculating the demodulation position based on the first read signal and the second read signal which correspond to the N burst demodulation signals read in the inner peripheral region IR and the outer peripheral region OR, the RRO learning unit 620 calculates the demodulation position by converting the N burst demodulation signal corresponding to the first read signal or the second read signal into the Q burst demodulation signal based on Expression (22).

FIG. 24 is a flowchart illustrating an example of an adjustment method of a parameter that is used in correlation of the linearity error according to the second embodiment.

The MPU 60 sets a demodulation route (B1801), records servo data read along the demodulation route in a particular recording region (B1802), adjust an initial phase correction value corresponding to a demodulation signal that is demodulated (B1803), adjusts a demodulation signal offset correction value corresponding to the demodulation signal (B1804), and calculates the phase difference θr for correcting demodulation signals obtained by demodulating pieces of servo data read from servo sectors by a plurality of read heads (B2401). With regard to the phase difference θr, demodulation positions dpos1 and dpos2 of the read head 15R1 and the read head 15R2 may be acquired, and then the phase difference θr may be calculated by a relationship of Tr=dpos2−dpos1 and Expression (19). For example, the MPU 60 reads N burst with the read heads 15R1 and 15R2 in the inner peripheral region IR or the outer peripheral region OR in which an absolute value of the cross track distance becomes greater than zero, and corrects the N burst demodulation signal obtained by demodulating the N burst read with the read head 15R2 to a correction demodulation signal corresponding to the Q burst demodulation signal obtained by demodulating the Q burst read with the read head 15R1 by using the phase difference θr. The MPU 60 adjusts a rotation correction value by using the correction demodulation signal corrected by using the N burst demodulation signal demodulated with the read head 15R1, the N burst demodulated with the read head 15R1, the N burst demodulated with the read head 15R2, and the phase difference θr and corrects a rotational deviation based on the adjusted rotation correction value (B1805), adjusts a gamma correction value by using the demodulation signal after rotation correction and calculates a demodulation position based on the adjusted gamma correction value (B1806), and determines whether or not the linearity error is small or large enough (B1807). In a case where it is determined that the linearity error is large (NO in B1807), the MPU 60 adjusts a table correction value (B1808), corrects the demodulation position based on the adjusted table correction value, and terminates the process.

According to the second embodiment, the magnetic disk device 1 can calculate a plurality of demodulation positions based on a plurality of N burst demodulation signals obtained by demodulating a plurality of pieces of burst data read from the N burst with the read head 15R1 and the read head 15R2 in the inner peripheral region IR or the outer peripheral region OR. Since the N burst can be read simultaneously with the read heads 15R1 and 15R2, the magnetic disk device 1 can adjust the linearity correction parameter based on the N burst signal of the read heads 15R1 and 15R2. According to this, even in the case of excluding the Q burst to improve servo format efficiency, the magnetic disk device 1 can calculate the servo demodulation position of which linearity is corrected based on the N burst signal that is read by using the read heads 15R1 and 15R2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk comprising a recording region including servo sectors;
a head configured to write data to the disk and read data from the disk; and
a controller configured to demodulate a plurality of pieces of demodulation data from servo data read from servo sectors, divide the demodulation data into a plurality of pieces of division data corresponding to division regions, perform linearity correction corresponding to a plurality of pieces of division data in each of the division regions, divide the demodulation data into a plurality of pieces of division data based on the amplitude relationship and sign of the N Burst data and Q Burst data obtained from the demodulation data, and perform linearity correction based on a plurality of parameters which respectively correspond to the pieces of division data in each of the division regions.

2. The magnetic disk device according to claim 1, wherein the controller makes the linearity correction errors be small by adjusting the parameters in each of the division regions based on the amplitude relationship and sign of the N Burst data and Q Burst data obtained from the demodulation data.

3. The magnetic disk device according to claim 1, wherein the controller divides the demodulation data into first division data, second division data, third division data, fourth division data, fifth division data, sixth division data, seventh division data, and eighth division data, performs first linearity correction corresponding to the first division data based on a first parameter corresponding to the first division data, performs second linearity correction corresponding to the second division data based on a second parameter corresponding to the second division data, performs third linearity correction corresponding to the third division data based on a third parameter corresponding to the third division data, performs fourth linearity correction corresponding to the fourth division data based on a fourth parameter corresponding to the fourth division data, performs fifth linearity correction corresponding to the fifth division data based on a fifth parameter corresponding to the fifth division data, performs sixth linearity correction corresponding to the sixth division data based on a sixth parameter corresponding to the sixth division data, performs seventh linearity correction corresponding to the seventh division data based on a seventh parameter corresponding to the seventh division data, and performs eighth linearity correction corresponding to the eighth division data based on an eighth parameter corresponding to the eighth division data.

4. The magnetic disk device according to claim 3, wherein the controller makes the first linearity error to the eighth linearity error be small by adjusting the first parameter to the eight parameters based on the division data.

5. The magnetic disk device according to claim 3, wherein Lissajous waveform is obtained from the N burst data and Q Burst data, the first division data corresponds to a first range from a first phase to a second phase in the Lissajous waveform, the second division data corresponds to a second range from the second phase to a third phase in the Lissajous waveform, the third division data corresponds to a third range from the third phase to a fourth phase in the Lissajous waveform, the fourth division data corresponds to a fourth range from the fourth phase to a fifth phase in the Lissajous waveform, the fifth division data corresponds to a fifth range from the fifth phase to a sixth phase in the Lissajous waveform, the sixth division data corresponds to a sixth range from the sixth phase to a seventh phase in the Lissajous waveform, the seventh division data corresponds to a seventh range from the seventh phase to an eighth phase in the Lissajous waveform, and the eighth division data corresponds to an eighth range from the eighth phase to a ninth phase in the Lissajous waveform, and
the first range to the eighth range are the same ranges.

6. The magnetic disk device according to claim 5, wherein the first range is a range of 0° to 45°, the second range is a range of 45° to 90°, the third range is a range of 90° to 135°, the fourth range is a range of 135° to 180°, the fifth range is a range of 180° to 225°, the sixth range is a range of 225° to 270°, the seventh range is a range of 270° to 315°, and the eighth range is a range of 315° to 360°.

7. The magnetic disk device according to claim 1, wherein the controller reads the servo sector by crossing a plurality of tracks of the disk and going around the disk by one round.

8. A magnetic disk device comprising:
a disk comprising a recording region including servo sectors;
a head configured to write data to the disk and read data from the disk; and
a controller configured to demodulate a plurality of pieces of demodulation data from servo data read from servo sectors, divide the demodulation data into a plurality of pieces of division data corresponding to division regions, perform linearity correction corresponding to a plurality of pieces of division data in each of the division regions,
wherein the head comprises a first read head and a second read head, and
the controller performs linearity correction which respectively correspond to the pieces of division data corresponding to first demodulation data obtained by demodulating first servo data read by the first read head and second demodulation data obtained by demodulating second servo data read by the second read head.

9. A magnetic disk device comprising:
a disk comprising a recording region including servo sectors;
a head configured to write data to the disk and read data from the disk; and
a controller configured to demodulate a plurality of pieces of demodulation data from servo data read form servo sectors, divide the demodulation data into a plurality of pieces of division data correspond to division regions obtained by dividing a Lissajous waveform obtained from the N burst data and Q Burst data, perform linearity correction corresponding to the division regions obtained by dividing a Lissajous waveform, for every phase, divide the Lissajous waveform into a first division region from a first phase to a second phase, a second division region from the second phase to a third phase, a third division region from the third phase to a fourth phase, a fourth division region from the fourth phase to a fifth phase, a fifth division region from the fifth phase to a sixth phase, a sixth division region from the sixth phase to a seventh phase, a seventh division region from the seventh phase to an eighth phase, and an eighth division region from the eighth phase to a ninth phase, and correct a plurality of the linearity errors which respectively correspond to the first division region and the eight division region.

10. A linearity correction method applied to a magnetic disk device comprising a disk comprising a recording region including servo sectors, and a head configured to write data to the disk and read data from the disk, the method comprising:
demodulating a plurality of pieces of demodulation data from servo data read form servo sectors, dividing the demodulation data into a plurality of pieces of division data correspond to division regions;
performing linearity correction corresponding to a plurality of pieces of division data in each of the division regions;
dividing the demodulation data into a plurality of pieces of division data based on the amplitude relationship and sign of the N Burst data and Q Burst data obtained from the demodulation data; and
performing linearity correction based on a plurality of parameters which respectively correspond to the pieces of division data in each of the division regions.

11. The linearity correction method according to claim 10, further comprising:
making the linearity errors be small by adjusting the parameters in each of the division regions based on the amplitude relationship and sign of the N Burst data and Q Burst data obtained from the demodulation data.

12. The linearity correction method according to claim 10, further comprising:
dividing the demodulation data into first division data, second division data, third division data, fourth division data, fifth division data, sixth division data, seventh division data, and eighth division data;
performing a first linearity correction corresponding to the first division data based on a first parameter corresponding to the first division data;
performing a second linearity correction corresponding to the second division data based on a second parameter corresponding to the second division data;
performing a third linearity correction corresponding to the third division data based on a third parameter corresponding to the third division data;
performing a fourth linearity correction corresponding to the fourth division data based on a fourth parameter corresponding to the fourth division data;
performing a fifth linearity correction corresponding to the fifth division data based on a fifth parameter corresponding to the fifth division data;
performing a sixth linearity correction corresponding to the sixth division data based on a sixth parameter corresponding to the sixth division data;
performing a seventh linearity correction corresponding to the seventh division data based on a seventh parameter corresponding to the seventh division data; and
performing an eighth linearity correction corresponding to the eighth division data based on an eighth parameter corresponding to the eighth division data.

13. The linearity correction method according to claim 12, further comprising:
making the first linearity error to the eighth linearity error be small by adjusting the first parameter to the eight parameters based on the division data.

14. The linearity correction method according to claim 12, wherein Lissajous waveform is obtained from the N burst data and Q Burst data, the first division data corresponds to a first range from a first phase to a second phase in the Lissajous waveform, the second division data corresponds to a second range from the second phase to a third phase in the Lissajous waveform, the third division data corresponds to a third range from the third phase to a fourth phase in the Lissajous waveform, the fourth division data corresponds to a fourth range from the fourth phase to a fifth phase in the Lissajous waveform, the fifth division data corresponds to a fifth range from the fifth phase to a sixth phase in the Lissajous waveform, the sixth division data corresponds to a sixth range from the sixth phase to a seventh phase in the Lissajous waveform, the seventh division data corresponds to a seventh range from the seventh phase to an eighth phase in the Lissajous waveform, and the eighth division data corresponds to an eighth range from the eighth phase to a ninth phase in the Lissajous waveform, and
the first range to the eighth range are the same ranges.

15. The linearity correction method according to claim 14, wherein the first range is a range of 0° to 45°, the second range is a range of 45° to 90°, the third range is a range of 90° to 135°, the fourth range is a range of 135° to 180°, the fifth range is a range of 180° to 225°, the sixth range is a range of 225° to 270°, the seventh range is a range of 270° to 315°, and the eighth range is a range of 315° to 360°.

16. The linearity correction method according to claim 10, further comprising:
performing the linearity correction which respectively correspond to the pieces of division data corresponding to first demodulation data obtained by demodulating first servo data read by a first read head of the head and second demodulation data obtained by demodulating second servo data read by a second read head of the head.

17. A linearity correction method applied to a magnetic disk device comprising a disk comprising a recording region including servo sectors, and a head configured to write data to the disk and read data from the disk, the method comprising:
demodulating a plurality of pieces of demodulation data from servo data read form servo sectors, dividing the demodulation data into a plurality of pieces of division data correspond to division regions;
performing linearity correction corresponding to a plurality of pieces of division data in each of the division regions;
reading the servo sector by crossing a plurality of tracks of the disk and going around the disk by one round.

\* \* \* \* \*